(12) United States Patent
Huang et al.

(10) Patent No.: US 10,194,370 B2
(45) Date of Patent: Jan. 29, 2019

(54) PROXIMITY INFORMATION IN CONFIGURATION OF DATA LINKS IN WIRELESS NETWORKS

(71) Applicant: Intel IP Corporation, Santa Clara, CA (US)

(72) Inventors: Po-Kai Huang, Santa Clara, CA (US); Emily Qi, Camas, WA (US); Elad Oelad Oren, Tel Aviv (IS)

(73) Assignee: INTEL IP Corporation, Santa Clara, CA (US)

(*) Notice: Subject to any disclaimer, the term of this patent is extended or adjusted under 35 U.S.C. 154(b) by 67 days.

(21) Appl. No.: 15/087,489

(22) Filed: Mar. 31, 2016

(65) Prior Publication Data

US 2017/0208531 A1 Jul. 20, 2017

Related U.S. Application Data

(60) Provisional application No. 62/279,665, filed on Jan. 15, 2016.

(51) Int. Cl.
*H04W 40/16* (2009.01)
*H04W 28/02* (2009.01)
(Continued)

(52) U.S. Cl.
CPC ......... *H04W 40/16* (2013.01); *H04W 28/021* (2013.01); *H04W 40/20* (2013.01);
(Continued)

(58) Field of Classification Search
CPC . H04W 40/16; H04W 40/20; H04W 72/1231; H04W 28/021; H04W 76/022;
(Continued)

(56) References Cited

U.S. PATENT DOCUMENTS 9,432,925 B2 * 8/2016 Kasslin ................. H04W 48/18
9,560,129 B2 * 1/2017 Balasingh ........... H04L 67/1046
(Continued)

FOREIGN PATENT DOCUMENTS

KR 101585372 1/2016
WO 2015160157 10/2015

OTHER PUBLICATIONS

International Preliminary Report on Patentability for PCT Application No. PCT/US2016/067298, dated Jul. 26, 2018, 10 pages.

*Primary Examiner* — Brian T O Connor
(74) *Attorney, Agent, or Firm* — Eversheds Sutherland (US) LLP

(57) ABSTRACT

Cluster management techniques for wireless data links are described. According to some such techniques, a wireless communication device may maintain proximity information for consideration in conjunction with assigning NAN data links to NAN data clusters. In some embodiments, a wireless communication device may store proximity information for a given NAN data link in an NDL attribute associated with that NAN data link, and may store proximity information for a given NAN data cluster in an NDC attribute associated with that NAN data cluster. In various embodiments, two wireless communication devices may utilize/consider such proximity information in conjunction with assigning a newly-created NAN data link to a NAN data cluster. In some embodiments, two wireless communication devices may utilize/consider such proximity information in conjunction with transferring an extant NAN data link from one NAN data cluster to another NAN data cluster.

25 Claims, 13 Drawing Sheets

(51) Int. Cl.
*H04W 40/20* (2009.01)
*H04W 72/12* (2009.01)
*H04W 4/08* (2009.01)
*H04W 48/12* (2009.01)
*H04W 56/00* (2009.01)
*H04W 8/00* (2009.01)
*H04W 40/24* (2009.01)
*H04W 52/02* (2009.01)
*H04W 48/16* (2009.01)
*H04W 76/14* (2018.01)
*H04W 76/12* (2018.01)

(52) U.S. Cl.
CPC .......... *H04W 72/1231* (2013.01); *H04W 4/08* (2013.01); *H04W 8/005* (2013.01); *H04W 40/244* (2013.01); *H04W 48/12* (2013.01); *H04W 48/16* (2013.01); *H04W 52/02* (2013.01); *H04W 52/0219* (2013.01); *H04W 56/00* (2013.01); *H04W 56/001* (2013.01); *H04W 72/1289* (2013.01); *H04W 76/12* (2018.02); *H04W 76/14* (2018.02); *Y02D 70/00* (2018.01); *Y02D 70/1242* (2018.01); *Y02D 70/1262* (2018.01); *Y02D 70/1264* (2018.01); *Y02D 70/142* (2018.01); *Y02D 70/144* (2018.01); *Y02D 70/146* (2018.01); *Y02D 70/162* (2018.01); *Y02D 70/164* (2018.01); *Y02D 70/166* (2018.01); *Y02D 70/168* (2018.01); *Y02D 70/21* (2018.01); *Y02D 70/22* (2018.01); *Y02D 70/26* (2018.01); *Y02D 70/34* (2018.01); *Y02D 70/38* (2018.01)

(58) Field of Classification Search
CPC . H04W 52/0219; H04W 48/16; H04W 52/02; H04W 76/023; H04W 72/1289; H04W 56/001; H04W 56/00; H04W 48/12; H04W 4/08; H04W 8/005; H04W 40/244
See application file for complete search history.

(56) References Cited

U.S. PATENT DOCUMENTS

| | | | | |
|---|---|---|---|---|
| 9,602,956 | B1* | 3/2017 | Jin | H04W 4/008 |
| 9,794,888 | B2* | 10/2017 | Abdelmonem | H04W 52/241 |
| 9,819,750 | B2* | 11/2017 | Raissinia | H04L 67/16 |
| 9,848,302 | B2* | 12/2017 | Yang | H04W 4/025 |
| 2014/0341073 | A1* | 11/2014 | Abraham | H04W 48/18 370/254 |
| 2015/0036540 | A1* | 2/2015 | Kasslin | H04W 48/18 370/254 |
| 2015/0071121 | A1* | 3/2015 | Patil | H04W 40/24 370/255 |
| 2015/0081840 | A1* | 3/2015 | Patil | H04L 67/28 709/217 |
| 2015/0350866 | A1* | 12/2015 | Patil | H04W 8/005 370/254 |
| 2016/0150537 | A1* | 5/2016 | Jung | H04W 48/16 455/452.1 |
| 2016/0223333 | A1* | 8/2016 | Thakur | H04W 40/20 |
| 2016/0255473 | A1* | 9/2016 | Abraham | H04W 4/023 370/328 |
| 2016/0309472 | A1* | 10/2016 | Yong | H04W 72/0446 |
| 2016/0366578 | A1* | 12/2016 | Abraham | H04W 8/005 |
| 2016/0380872 | A1* | 12/2016 | Halvarsson | H04L 45/02 370/252 |
| 2017/0006117 | A1* | 1/2017 | Kafle | H04B 17/318 |
| 2017/0055261 | A1* | 2/2017 | Kurian | H04L 5/0012 |
| 2017/0055305 | A1* | 2/2017 | Kurian | H04L 5/0012 |
| 2017/0086157 | A1* | 3/2017 | Abraham | H04W 56/004 |
| 2017/0150296 | A1* | 5/2017 | Jung | H04L 12/1886 |
| 2017/0208557 | A1* | 7/2017 | Patil | H04W 56/001 |
| 2018/0054698 | A1* | 2/2018 | Park | H04W 4/02 |

* cited by examiner

PROXIMITY INFORMATION IN CONFIGURATION OF DATA LINKS IN WIRELESS NETWORKS

CROSS-REFERENCE TO RELATED APPLICATION

This application is related to and claims priority from U.S. Provisional Patent Application No. 62/279,665, filed Jan. 15, 2016, the content of which application are hereby incorporated herein by reference in its entirety.

BACKGROUND

Using Neighbor Awareness Networking (NAN) (also referred to as "Wi-Fi Aware") discovery procedures, a wireless communication device may be able to discover other nearby devices and/or available services in a manner that involves relatively low power consumption. A group of such devices may form a cluster, and each device in the cluster may be synchronized to the same clock. Those devices may converge on a time period and channel associated with a discovery window (DW) to facilitate the discovery of each other's services. One major goal of Wi-Fi Aware 2.0 (or NAN2) is to develop schemes wherein devices can transmit data to each other without any infrastructure (e.g., AP). In particular, after the discovery process, two devices may form a NAN data link to transmit data to each other. Each NAN data link may have a respective associated NAN data link schedule (also referred to as "NDL schedule"). Further, multiple NAN data links may form a NAN data cluster (NDC), and there may be a common schedule (also referred to as "NDC base schedule") for management operations of the NAN data cluster. With respect to each NAN data link in a given NAN data cluster, the associated NDL schedule may comprise a superset of the NDC base schedule for the NAN data cluster.

BRIEF DESCRIPTION OF THE DRAWINGS

The accompanying drawings form an integral part of the disclosure and are incorporated into the present specification. The drawings illustrate example embodiments of the disclosure and, in conjunction with the description and claims, serve to explain at least in part various principles, features, or aspects of the disclosure. Certain embodiments of the disclosure are described more fully below with reference to the accompanying drawings. However, various aspects of the disclosure can be implemented in many different forms and should not be construed as limited to the implementations set forth herein. Like numbers refer to like elements throughout.

DETAILED DESCRIPTION

Figure 1:
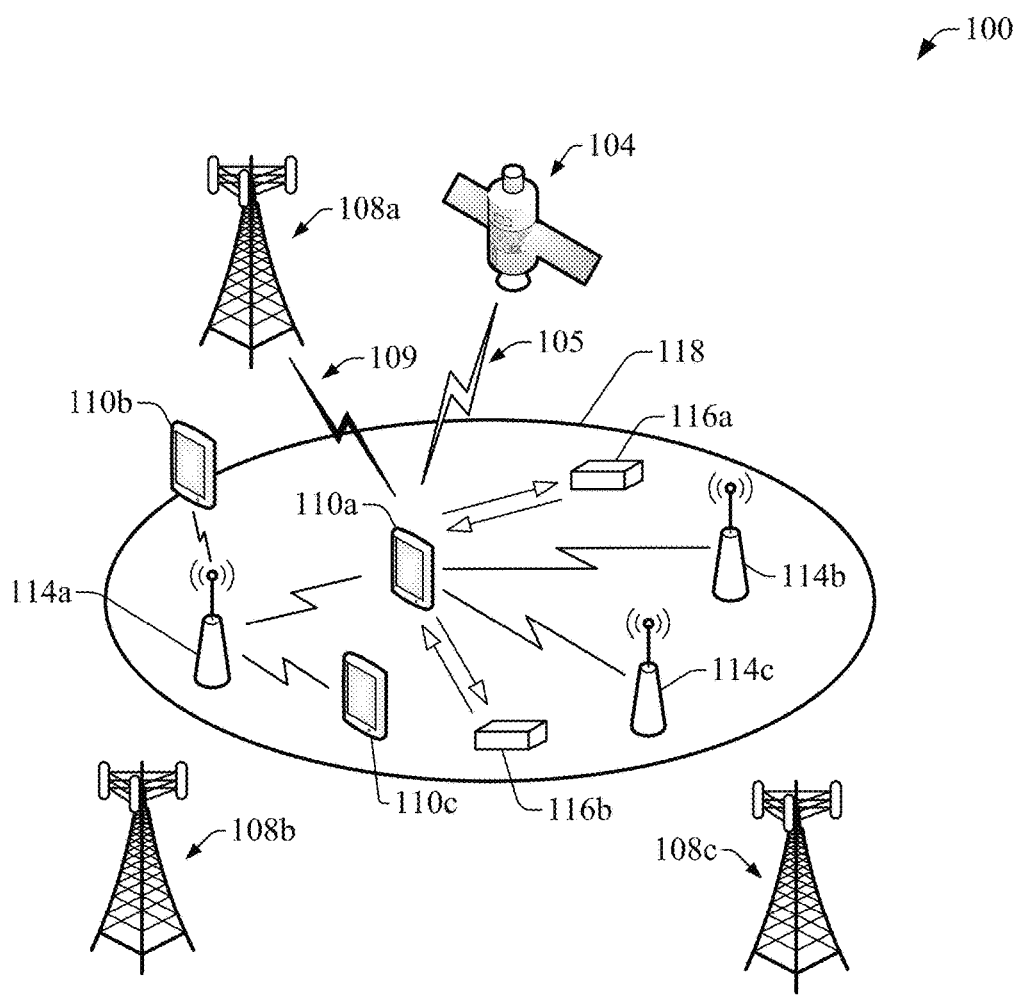
FIG. 1 presents an example of an operational environment for wireless communication in accordance with one or more embodiments of the disclosure.

Various embodiments may be generally directed to cluster management techniques for wireless data links. According to some such techniques, a wireless communication device may maintain proximity information for consideration in conjunction with assigning NAN data links to NAN data clusters. In various embodiments, the proximity information may include proximity information for one or more NAN data links and/or proximity information for one or more NAN data clusters. In some embodiments, a wireless communication device may store proximity information for a given NAN data link in an NDL attribute associated with that NAN data link, and may store proximity information for a given NAN data cluster in an NDC attribute associated with that NAN data cluster. In various embodiments, two wireless communication devices may utilize/consider such proximity information in conjunction with assigning a newly-created NAN data link to a NAN data cluster. In some embodiments, two wireless communication devices may utilize/consider such proximity information in conjunction with transferring an existing NAN data link from one NAN data cluster to another NAN data cluster. Other embodiments are described and claimed.

While various embodiments of the disclosure are illustrated in connection with a network that operates according to Tread network protocols, it is noted that disclosure is not limited in this respect and embodiments of the disclosure can be implemented in any low-power network having devices that operate at low power and can transition between a power-sleep mode (or low-power mode) to a power-awake mode (or high-power mode) during operation within the network. Further, the elements described herein in connection with configuration of data links in wireless networks, such as Thread networks, can be implemented in any type of low-power networks operating according to protocols for wireline communication and/or radio technology protocol for wireless communication, not just Thread protocols. Embodiments described herein can provide systems, methods, and devices, for signaling information to Wi-Fi devices in various Wi-Fi networks, including Wi-Fi Aware™, also referred to as neighbor awareness networking (NAN) network.

As illustrated and described herein, various embodiments may comprise one or more elements. An element may comprise any structure arranged to perform certain operations. Each element may be implemented as hardware, software, or any combination thereof, as desired for a given set of design parameters or performance constraints. Although an embodiment may be described with a limited number of elements in a certain topology by way of example, the embodiment may include more or less elements in alternate topologies as desired for a given implementation. It is worthy to note that any reference to "one embodiment" or "an embodiment" means that a particular feature, structure, or characteristic described in connection with the embodiment is included in at least one embodiment. The appearances of the phrases "in one embodiment," "in some embodiments," and "in various embodiments" in various places in the specification are not necessarily all referring to the same embodiment.

With reference to the drawings, FIG. 1 presents a block diagram of an example operational environment 100 for wireless communication in accordance with at least certain aspects of the disclosure. The operational environment 100 includes several telecommunication infrastructures and communication devices, which collectively can embody or otherwise constitute a telecommunication environment. More specifically, yet not exclusively, the telecommunication infrastructures can include a satellite system 104. As described herein, the satellite system 104 can be embodied in or can include a global navigation satellite system (GNSS), such as the Global Positioning System (GPS), Galileo, GLONASS (Globalnaya navigatsionnaya sputnikovaya sistema), BeiDou Navigation Satellite System (BDS), and/or the Quasi-Zenith Satellite System (QZSS). In addition, the telecommunication infrastructures can include a macro-cellular or large-cell system; which is represented with three base stations 108a-108c; a micro-cellular or small-cell system, which is represented with three access points (or low-power base stations) 114a-114c; and a sensor-based system—which can include proximity sensor(s), beacon device(s), pseudo-stationary device(s), and/or wearable device(s)—represented with functional elements 116a-116c. As illustrated, in one implementation, each of the transmitter(s), receiver(s), and/or transceiver(s) included in respective computing devices (such as telecommunication infrastructure) can be functionally coupled (e.g., communicatively or otherwise operationally coupled) with the wireless device 110a (also referred to as communication device 110a) via wireless link(s) in accordance with specific radio technology protocols (e.g., IEEE 802.11a, IEEE 802.11ax, etc.) in accordance with aspects of this disclosure. For another example, a base station (e.g., base station 108a) can be functionally coupled to the wireless devices 110a, 110b, and 110c via respective an upstream wireless link (UL) and a downstream link (DL) configured in accordance with a radio technology protocol for macro-cellular wireless communication (e.g., 3$^{rd}$ Generation Partnership Project (3GPP) Universal Mobile Telecommunication System (UMTS) or "3G," "3G"; 3GPP Long Term Evolution (LTE), or LTE); LTE Advanced (LTE-A)). For yet another example, an access point (e.g., access point (AP) device 114a) can be functionally coupled to one or more of the wireless devices 110a, 110b, or 110c via a respective UL and DL configured in accordance with a radio technology protocol for small-cell wireless communication (e.g., femtocell protocols, Wi-Fi, and the like). For still another example, a beacon device (e.g., device 116a) can be functionally coupled to the wireless device 110a with a UL-only (ULO), a DL-only, or an UL and DL, each of such wireless links (represented with open-head arrows) can be configured in accordance with a radio technology protocol for point-to-point or short-range wireless communication (e.g., ZigBee®, Bluetooth®, or near field communication (NFC) standards, ultrasonic communication protocols, or the like).

In the operational environment 100, the small-cell system and/or the beacon devices can be contained in a confined area 118 that can include an indoor region (e.g., a commercial facility, such as a shopping mall) and/or a spatially-confined outdoor region (such as an open or semi-open parking lot or garage). The small-cell system and/or the beacon devices can provide wireless service to a device (e.g., wireless device 110a or 110b) within the confined area 118. For instance, the wireless device 110a can handover from macro-cellular wireless service to wireless service provided by the small-cell system present within the confined area 118. Similarly, in certain scenarios, the macro-cellular system can provide wireless service to a device (e.g., the wireless device 110a) within the confined area 118.

In certain embodiments, the wireless device 110a, as well as other communication devices (wireless or wireline) contemplated in the present disclosure, can include electronic devices having computational resources, including processing resources (e.g., processor(s)), memory resources (memory devices (also referred to as memory), and communication resources for exchange of information within the computing device and/or with other computing devices. Such resources can have different levels of architectural complexity depending on specific device functionality. Exchange of information among computing devices in accordance with aspects of the disclosure can be performed wirelessly as described herein, and thus, in one aspect, the wireless device 110a also can be referred to as wireless communication device 110a, wireless computing device 110a, communication device 110a, or computing device 110a interchangeably. The same nomenclature considerations apply to wireless device 110b and wireless device 110c. More generally, in the present disclosure, a communication device can be referred to as a computing device and, in certain instances, the terminology "communication device" can be used interchangeably with the terminology "computing device," unless context clearly dictates that a distinction should be made. In addition, a communication device (e.g., communication device 110a or 110b or 110c) that operates according to HEW can utilize or leverage a physical layer convergence protocol (PLCP) and related PLCP protocol data units (PPDUs) in order to transmit and/or receive wireless communications. Example of the computing devices that can communicate wirelessly in accordance with aspects of the present disclosure can include desktop computers with wireless communication resources; mobile computers, such as tablet computers, smartphones, notebook computers, laptop computers with wireless communication resources, Ultrabook™ computers; gaming consoles, mobile telephones; blade computers; programmable logic controllers; near field communication devices; customer premises equipment with wireless communication resources, such as set-top boxes, wireless router devices, wireless-enabled television sets, or the like; and so forth. The wireless communication resources can include radio units (also referred to as radios) having circuitry for processing of wireless signals, processor(s), memory device(s), and the like, where the radio, the processor(s), and the memory device(s) can be coupled via a bus architecture.

The computing devices included in the example operational environment 100, as well as other computing devices contemplated in the present disclosure, can implement or otherwise perform the configuration of data links associated with a sleepy-end device (SED) or another type of wireless device, as described herein. It is noted that other functional elements (e.g., server devices, router devices, gateway devices, and the like) can be included in the operational environment 100. It is also noted that the configuration of data links in accordance with aspects of this disclosure can be implemented in any telecommunication environment including a wireline network (e.g., a cable network, an internet-protocol (IP) network, an industrial control network, any wide area network (WAN), a local area network (LAN), a personal area network (PAN), a home area network (HAN) (such as a sensor-based network) or the like); a wireless network (e.g., a cellular network (either small-cell network or macro-cell network), a wireless WAN (WWAN), a wireless LAN (WLAN), a wireless PAN (WPAN), a wireless HAN, such as a wireless sensor-based network, a satellite network, or the like); a combination thereof; or the like.

Figure 2:
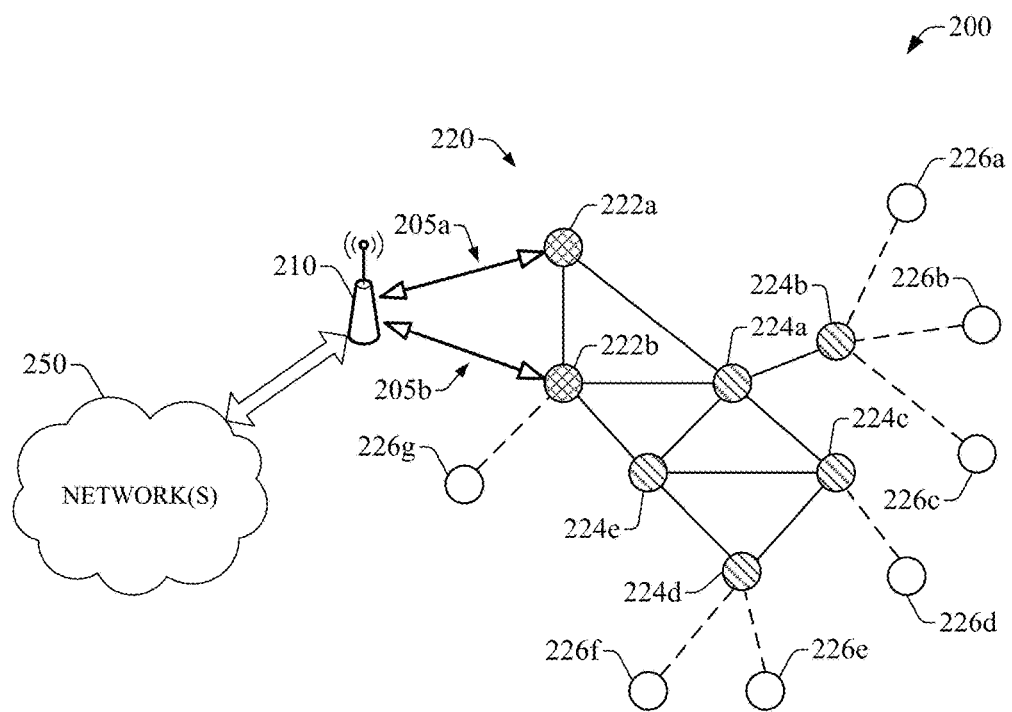
FIG. 2 presents another example of an operational environment in accordance with one or more embodiments of the disclosure.

FIG. 2 illustrates an example of an operational environment 200 in accordance with one or more embodiments of the disclosure. The operational environment 200 includes a mesh network 220 having devices that can operate according to Thread protocols and/or any other communication protocols suitable for, among other things, IP-based communication (e.g., IPv6 protocol), low-power, secure, low-latency (e.g., less than about 100 ms) and/or scalable operation of the devices (e.g., smartphones, tablet computers, appliances, sensors, locks, and the like). The devices can include, in some embodiments; appliances; devices for access control (e.g., locks); devices for climate control (e.g., temperature sensors, heaters, refrigeration devices, etc.); devices for energy management; lamps, light bulbs, or other type of devices for lightning; devices for safety (e.g., cameras) and or other types of security (e.g., alarms). Some of the devices can be powered via a conventional power grid, other devices can be powered via a combination between power grid and battery or other type of energy storage, and yet other devices can be powered via batteries or elements for energy harvesting. At least some of the devices included in the mesh network 220 also can communicate according to other protocols, such as Wi-Fi protocols, beyond Thread protocols or NAN protocols. In some implementations, the mesh network 220 is functionally coupled to an AP device 210 that permits functional coupling with one or more external networks 250 (such as the Internet or another type of WAN/WWAN). One or more devices within the mesh network 220 can permit functional coupling between the mesh network 220 and the AP device 210, each of the one or more devices can be referred to as border router device (or border router). In some embodiments, Wi-Fi wireless links can permit exchange of information between the AP device 220 and the one or more border routers. In other embodiments, other types of wireless links (e.g., femtocell wireless links) or wireline links (e.g., Ethernet links) can permit communication between the one or more border router devices and the AP device 210. As illustrated, in the operational environment 200, border routers 222a and 222b can be functionally coupled to AP device 210 via Wi-Fi links 205a and 205b, respectively. A border router can be functionally coupled to one or more devices within the mesh network 220, at least one of the devices coupled to the border router can be referred to as a router node or router device. Other device(s) coupled to the border router can be a leaf node (e.g., a SED). Border router devices can provide services, such as routing services for off-network operations, for devices within the mesh network 220.

A router device can provide routing services to devices within the mesh network 220. In addition or in the alternative, a router device can provide joining services and/or security services for a device that attempts to join the mesh network 220. As opposed to SEDs, a router is not configured to enter a power-off mode or other type of low-power state. The exemplified operational environment includes five router devices 224a-224d. In some embodiments, border router devices and router devices can exchange information according to Thread protocols. In one example, wireless links pertaining to a Thread WPAN (such as 6Lo links) can permit communication of network data and/or network signaling between such devices. Such links are represented as solid lines in FIG. 2.

In addition, a router device (e.g., router device 224b) can be coupled to one or more leaf nodes (or leaf devices) within the mesh network 220. In one implementation, a lead node can be referred to as a SED. A leaf node (or SED) can be embodied in or can include a host device, and can communicate via a parent router device associated with the lead node. As such, the leaf node cannot forward messages to another lead node. The illustrated operational environment 200 includes seven leaf nodes 226a-226g. In some embodiments, wireless links pertaining to a Thread WPAN (such as 6Lo Sleepy links) can permit communication of network data and/or network signaling between a router device and a leaf node. Such wireless links are represented with dashed lines in FIG. 2. A leaf node (or SED) can be powered via a battery or other type of energy storage and supply device. In addition or in some embodiments, a leaf node can be powered via a device that permits harvesting energy (e.g., a solar panel, a turbine, geothermal energy conversion devices, etc.). Leaf nodes can include one or more of thermostats; light switches; smoke detectors; carbon monoxide detectors; display devices; door bells; intrusion sensors; automated cleaning devices; door sensors or other type of presence sensors; actuation sensors (e.g., window, door, etc.); motion sensors; door locks; radiator valves; biometric devices; fans; smart plugs; smart meters or other types of dosimeter devices; appliances; heating, ventilation, and air conditioning (HVAC) equipment; a combination of the foregoing, or the like.

Figure 3:
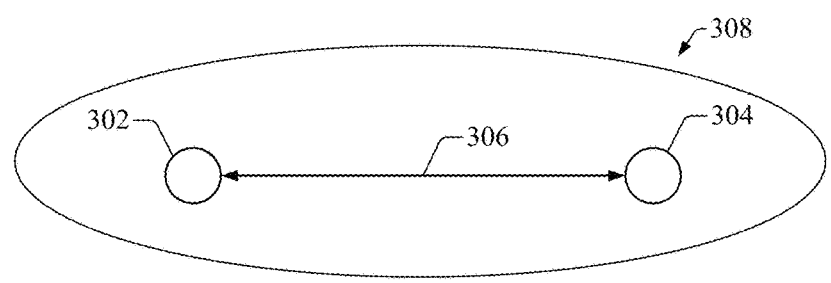
FIG. 3 presents yet another example of an operational environment in accordance with one or more embodiments of the disclosure.

FIG. 3 presents an example of an operational environment 300 in accordance with one or more embodiments of the disclosure. As illustrated, the operational environment 300 includes a device 302 and a device 304 that can communicate wirelessly, e.g., each of the devices 302 and 304 can send and/or receive information wirelessly. More specifically, in some aspects, the device 302 and the device 304 may discover each other by exchanging wireless communications according to a device discovery protocol. In some embodiments, the device discovery protocol may comprise a NAN device discovery procedure. In various such embodiments, the devices 302 and 304 may also engage in a NAN service discovery procedure, according to which one or both of the devices 302 and 304 may discover one or more services offered by the other device.

In addition or in some embodiments, the devices 302 and 304 can communicate according to a radio technology protocol that enables such devices to exchange information directly (e.g., point-to-point), rather than exchanging the information via intermediary infrastructure, such as an AP device. In some embodiments, the radio technology protocol can include a NAN2 data communication protocol. As such, in some aspects, following discovery, the devices 302 and 304 may exchange wireless communications in order to establish a data link (e.g., a NAN data link) 306 between devices 302 and 304. In some embodiments, the devices 302 and 304 may establish the data link 306 by performing operations (including communications, for example) in accordance with one or more NAN2 procedures for the establishment of a NAN data link.

As an illustration, in some embodiments, according to the NAN2 data communication protocol, an NDL schedule may be defined or otherwise established for the data link 306. In some embodiments, according to such a radio technology protocol for wireless communication of data, it may be possible to associate multiple NAN data links with a same NAN data cluster. In various embodiments, the data link 306 (e.g., a NAN data link) may be assigned to a data path group 308 associated with a cluster of devices including the devices 302 and 304. The data path group 308 can be embodied in or can include, for example, a NAN data cluster. In some embodiments, according to the data communication scheme, an NDC base schedule may be defined or otherwise adopted for the data path group 308 (e.g., a NAN data cluster). In various embodiments, according to the NAN2 data communication protocol, a separate respective NDL schedule may be defined or otherwise adopted for each NAN data link associated with the data path group 308. In some embodiments, each of the respective NDL schedules may comprise a superset of the NDC base schedule for data path group 308. In various embodiments, according to the NAN2 data communication protocol, synchronization may need to be maintained among all of the devices that communicate via NAN data links of a NAN data cluster or another type of data path group associated with a cluster of wireless devices. In such embodiments, synchronization may need to be maintained between the devices 302 and 304, as well as between both the device 302 and the device 304 and each other device that may communicate via another data link (e.g., a NAN data link; not shown) associated with the data path group 308.

Figure 4:
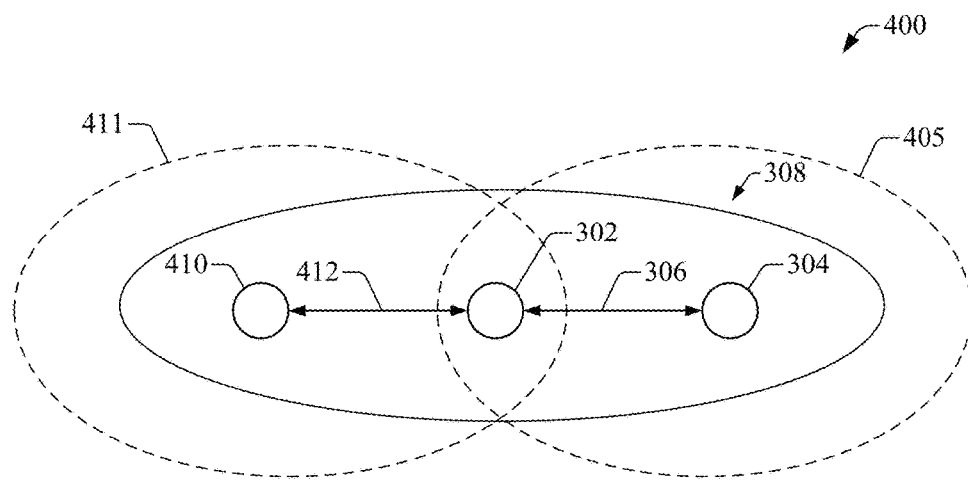
FIG. 4 presents still another example of an operational environment in accordance with one or more embodiments of the disclosure.

FIG. 4 presents an example of an operational environment 400 in accordance with one or more embodiments of the disclosure. In some aspects, wireless communication within the operational environment 400 can include synchronization among some or all of the devices that communicate via data links (e.g., NAN data links) of a data path group (e.g., a NAN data cluster). In operational environment 400, the device 302 may perform a discovery process with a device 410, and the devices 302 and 410 may then establish a data link 412 and associate it with the data path group 308. Since the device 410 can communicate via the data link 412, the association of the data link 412 with the data path group 308 may rely on or otherwise may necessitate that tight synchronization be maintained between the device 410 and both of devices 302 and 304. However, in some aspects, if devices 410 and 304 are located outside of each other's respective wireless communications ranges 411 and 405, then multi-hop management communications via the device 302 may be required in order to maintain tight synchronization between device 410 and device 304. In addition or in other aspects, multi-hop management communications may be required in conjunction with maintenance of the NDC base schedule or another type of base schedule for the data cluster 308, resulting in increased complexity. In cases in which some devices in a data path group (e.g., a NAN data cluster) are not within wireless communication range of other devices within the data path group, the number of slots for common schedule operation in the data path group may shrink due to differences in the scheduling constraints to which devices in various remotely-spaced regions of the data path group may be subject.

As mentioned, embodiments of this disclosure can permit configuration of data links associated with a data path group in a wireless network, such as a low-power wireless network. According to some of such embodiments, devices, such as devices 302, 304, and 410, can be configured to access and/or to retain proximity information that can be utilized or otherwise leveraged in the assignment of a data link to a data path group. As described herein, in some embodiments, the data link can be embodied in or can include a NAN data link, and the data path group can be embodied in or can include a NAN data cluster (NDC). In various embodiments, the proximity information that a device can retain may include proximity information for one or more NAN data links and/or proximity information for one or more NAN data clusters. In some embodiments, a device may store proximity information for a given NAN data link in an NDL attribute associated with that NAN data link, and/or may store proximity information for a given NAN data cluster in an NDC attribute associated with that NAN data cluster. In various embodiments, two devices may utilize/consider such proximity information in conjunction with assigning a newly-created NAN data link to a NAN data cluster. In some embodiments, two devices may utilize/consider such proximity information in conjunction with transferring an existing NAN data link from one NAN data cluster to another NAN data cluster.

Figure 5A:
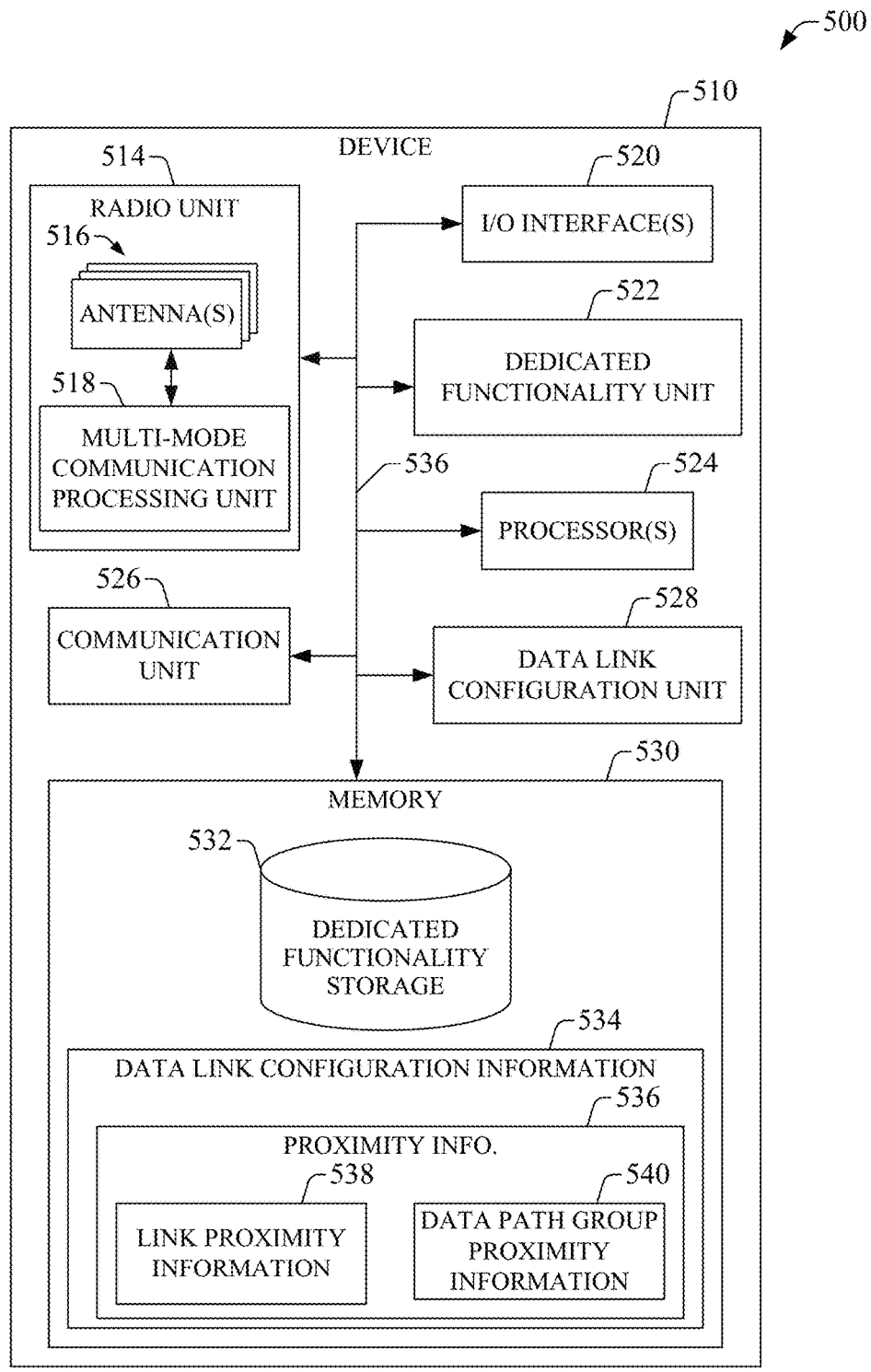
FIG. 5A presents an example of a device in accordance with one or more embodiments of the disclosure.

FIG. 5A illustrates a block diagram of an example embodiment of a device 510 in accordance with one or more embodiments of the disclosure. The exemplified device 510 can operate in accordance with at least some aspects of the disclosure, configuring data path groups as described herein, for example. As mentioned, in some embodiments, the device 510 can embody or can constitute any one of the devices in a data path group associated with a cluster of devices in accordance with this disclosure. Similarly, in other embodiments, the device 510 can embody or can constitute a device in a low-power mesh network, such as the example mesh network 220 in FIG. 2. As such, the device 510 can embody a border router device, a router device, a leader device, or a SED. In yet other embodiments, the device 510 can embody or can constitute the AP device 310 or any of the devices in the operational environment 100 shown in FIG. 1 or the operational environment 200 shown in FIG. 2. As such, in some aspects, the device 510 can provide one or more specific functionalities—such as operating as a digital camera and generating digital images (e.g., static pictures and/or motion pictures); operating as a navigation device; operating as a biometric device (e.g., a heart rate monitor, a pressure monitor, a glucometer, an iris analyzer, a fingerprint analyzer, etc.); dosing and delivering an amount of a drug or other compound; operating as a sensor and sensing a defined physical quantity, such as temperature and/or pressure, or motion; operating as another sensor and sensing a compound in gas phase or liquid phase; operating as a controller for configuring a second defined physical quantity, managing energy, managing access to an environment, managing illumination and/or sound, regulating a defined process, such an automation control process, or the like; generating current, voltage, or other type of signal via inductive coils; a combination of the foregoing; a derivative functionality of the foregoing; or the like. To that end, the device 510 can include one or more functionality units 522 (referred to as dedicated functionality unit 522) that can include optical elements (e.g., lenses, collimators, light guides, light sources, light detectors (such as semiconductor light detectors), focusing circuitry, etc.); temperature sensors; pressure sensors; gas sensors; motion sensors, including inertial sensors (such as linear accelerator and/or a gyroscope); mechanical actuators (such as locks, valves, and the like); a combination of the foregoing; or the like.

In addition or in other aspects, a specific functionality of the device 510 can be provided or otherwise implemented via one or more processors 524. In some implementations, at least one of the processor(s) 524 can be integrated with dedicated functionality unit 522. In some implementations, at least one of the processor(s) (e.g., one or more of the processor(s) 524 or other processor(s)) can receive and operate on data and/or other type of information (e.g., analog signals) generated by components of the dedicated functionality unit 522. The at least one processor can execute a module in order to operate on the data and/or other type of information and, as a result, provide a defined functionality. The module can be embodied in or can include, for example, a software application stored in a memory device integrated into or functionally coupled to the device. For instance, the module can be retained in one or more memory devices 532 (collectively referred to as dedicated functionality storage 532), where the dedicated functionality storage 532 can be retained within one or more other memory devices 530 (collectively referred to as device 530). In addition or in other implementations, at least a second one of the processor(s) (e.g., one or more of processor(s) 524 or other processor(s) available to the dedicated functionality unit 522) can control the operation or duty cycle of a portion of the dedicated functionality unit 522 so as to collect data and/or other type of information; provide an amount (or a dose) of a compound or acquire another amount of another compound or material; a combination of the foregoing; or the like. At least one of the units that constitute the dedicated functionality unit 522 can generate control signals (e.g., interruptions, alarms, or the like) and/or can cause the device 510 to transition between operational states in response to a defined condition of the device 510 or its environment. At least some of the control signals can be sent to an external device (not depicted in FIG. 5A) via an I/O interface of the I/O interfaces 520. The type and/or number of components included in the dedicated functionality unit 522 can establish, at least in part, the complexity of the device 510. In some examples, the device 510 can embody or can constitute an AP device, and in other examples, the device 510 can embody or can constitute a SED or another type of IoT device.

The device 510 also can operate as a wireless device and can embody or can constitute an access point device, a mobile computing device (e.g., a station device or user equipment), or other types of communication devices that can transmit and/or receive wireless communications in accordance with this disclosure. In some aspects, to permit wireless operation—including the exchange of information associated with configuration of a data path group, as described herein—the device 510 includes a radio unit 514, a communication unit 526, and a data-path-group configuration unit 528. In some implementations, the communication unit 526 can generate packets and/or other types of information blocks via a network stack, for example, and can convey the packets and/or the other types of information blocks to the radio unit 514 for wireless communication. In one embodiment, the network stack (not shown) can be embodied in or can constitute a library or other types of programming modules, and the communication unit 526 can execute the network stack in order to generate a packet or other types of information block. Generation of the packet or the other types of information blocks can include, for example, generation of control information (e.g., checksum data, communication address(es)), traffic information (e.g., payload data), and/or formatting of such information into a specific packet header.

The data-path-group configuration unit 528 can perform or otherwise facilitate, at least in part, the configuration of a data link in accordance with aspects of this disclosure, as described herein. To that end, in some embodiments, the data link configuration 528 can include a number of components that can utilize or otherwise leverage information (e.g., data, metadata, and/or instructions) first information defining or otherwise specifying implementations of one or more mechanisms for configuration of a data link and/or second information indicative of rules, records, or other data associated with such implementations in accordance with aspects of the disclosure. In some instances, the first information and the second information can be retained in one or more memory elements 534 (collectively referred to as data link configuration information 534) within one or more memory devices 530 (collectively referred to as memory 530). In addition or in other implementations, the first information and/or the second information can be retained within one or more other memory devices integrated into the data link configuration unit 528. The data-path-group configuration unit 528 also can utilize or otherwise leverage, in other embodiments, the communication unit 526 in order to configure a data link in accordance with aspects of this disclosure, as described herein.

As illustrated in FIG. 5A, the data link information 534 can include, for example, proximity information 536 that can be utilized or otherwise leveraged in the configuration of a data link, e.g., a selection of NAN data clusters to which a NAN data link can be assigned. In some embodiments, proximity information 536 can include proximity information associated with one or more data links (or, in some instances, data paths), such as NAN data links. In addition or in other embodiments, the proximity information 536 can include proximity information associated with one or more data path groups associated with respective clusters of devices (e.g., NAN data clusters). In some aspects, at least a portion of the proximity information 536 can be associated with a specific data link. Examples of an element of proximity information 314 according to some embodiments may include a received signal strength indicator (RSSI); a distance or range estimate of another device remotely located with respect to the device 510; a location estimate of the other device; and/or channel information, such as a channel path loss measurements. Other information representative of a physical separation of the device 510 from another device (not depicted in FIG. 5A) also can be included in the proximity information 534.

In various embodiments, the proximity information 534 may include link proximity information 538. In some embodiments, link proximity information 538 can include information indicative or otherwise representative of proximities associated with one or more NAN data links over which the device 510 can communicate. In various embodiments, link proximity information 538 may include respective link proximity information for each NAN data link of wireless communication device 510. In some embodiments, the device 510 can retain a portion of the link proximity information 538 associated with a NAN data link in an attribute associated with the NAN data link. In various embodiments, an element of the link proximity information 538 associated with a data link (e.g., a NAN data link) established with a remote device can be embodied in or can include a received signal strength indicator (e.g., RSSI) for one or more wireless signals received from the remote device. In addition or in other embodiments, an element of the link proximity information 538 associated with a NAN data link established with a remote device may indicate a channel loss or data path loss between the device 510 and the remote device. Further or in yet other embodiments, an element of the link proximity information 538 associated with a NAN data link established with a remote device may indicate an estimated distance between wireless communication device 302 and that neighboring device. In some scenarios, the estimated distance can be determined using at least a ranging mechanism. The ranging mechanism can be implemented, for example, by the dedicated functionality unit 522. Furthermore or in other embodiments, an element of the link proximity information 538 associated with a data link (e.g., a NAN data link) established with a remote device may indicate an estimated location of the remote device. As mentioned, in one scenario, the estimated location can be determined using at least a ranging mechanism or other types of location mechanism.

As further illustrated in FIG. 5A, the proximity information 536 may include data path group proximity information 540. In some embodiments, at least a portion of the data path group proximity information 540 can be indicative or otherwise representative of proximities associated with one or more data path groups (e.g., NAN data clusters) that can include the device 510. In some aspects, each (or in some embodiments, at least one) of such data path groups may be embodied in or may include a NAN data cluster to which one or more NAN data links of the device 510 have been assigned. In some embodiments, at least a portion of the data path group proximity information 540 may include respective cluster proximity information for each (or in some embodiments, at least one) NAN data cluster to which at least one NAN data link of the device 510 has been assigned. In various embodiments, the device 510 may retain the data path group proximity information 540 associated with any given NAN data cluster in an NDC attribute associated with the NAN data cluster.

Figure 5B:
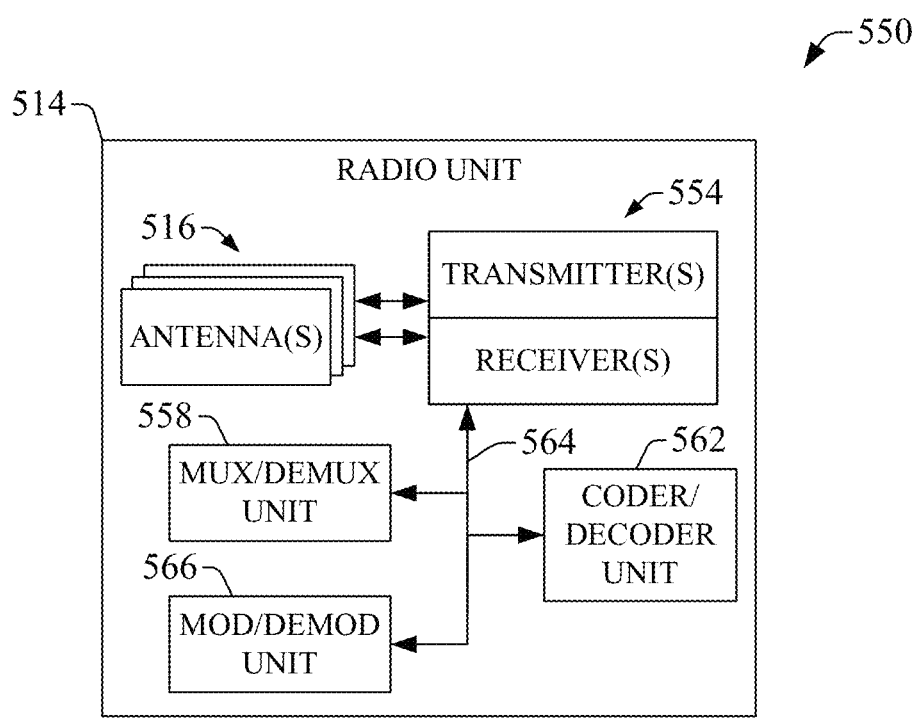
FIG. 5B presents an example of a radio unit for wireless communication in accordance with one or more embodiments of the disclosure.

As illustrated in FIG. 5B, the radio unit 514 can include one or more antennas 516 and a multi-mode communication processing unit 518. In some embodiments, the antenna(s) 516 can be embodied in or can include directional or omnidirectional antennas, including, for example, dipole antennas, monopole antennas, patch antennas, loop antennas, microstrip antennas or other types of antennas suitable for transmission of RF signals. In addition, or in other embodiments, at least some of the antenna(s) 516 can be physically separated to leverage spatial diversity and related different channel characteristics associated with such diversity. Further or in yet other embodiments, the multi-mode communication processing unit 518 that can process at least wireless signals in accordance with one or more radio technology protocols and/or modes (such as multiple-input multiple-output (MIMO), single-input-multiple-output (SIMO), multiple-input-single-output (MISO), and the like). Each of such protocol(s) can be configured to communicate (e.g., transmit, receive, or exchange) data, metadata, and/or signaling over a specific air interface. The one or more radio technology protocols can include, for example, 3GPP UMTS; LTE; LTE-A; Wi-Fi protocols, such as those of the Institute of Electrical and Electronics Engineers (IEEE) 802.11 family of standards; Worldwide Interoperability for Microwave Access (WiMAX); radio technologies and related protocols for ad hoc networks, such as Bluetooth® or ZigBee®; other protocols for packetized wireless communication; or the like). The multi-mode communication processing unit 418 also can process non-wireless signals (analogic, digital, a combination thereof, or the like).

In some embodiments, e.g., example embodiment 550 shown in FIG. 5B, the multi-mode communication processing unit 518 can comprise a set of one or more transmitters/receivers 554, and components therein (amplifiers, filters, analog-to-digital (A/D) converters, etc.), functionally coupled to a multiplexer/demultiplexer (mux/demux) unit 568, a modulator/demodulator (mod/demod) unit 566 (also referred to as modem 516), and a coder/decoder unit 512 (also referred to as codec 512). Each (or, in some instances, at least one) of the transmitter(s)/receiver(s) can form respective transceiver(s) that can transmit and receive wireless signal (e.g., electromagnetic radiation) via the one or more antennas 516. It is noted that in other embodiments, the multi-mode communication processing unit 518 can include, for example, other functional elements, such as one or more control units (e.g., a memory controller), an offload engine or unit, I/O interfaces, baseband processing circuitry, a combination of the foregoing, or the like. While illustrated as separate blocks in the device 510, it is noted that in some embodiments, at least a portion of the multi-mode communication processing unit 518, the communication unit 526, and/or data-path-group configuration unit can be integrated into a single unit—e.g., a single chipset or other type of solid state circuitry. In some aspects, such a single unit can be configured by programmed instructions retained in memory 530 and/or other memory devices integrated into or otherwise functionally coupled to the single unit.

Electronic components and associated circuitry, such as mux/demux unit 558, codec 562, and modem 566 can permit or otherwise facilitate processing and manipulation, e.g., coding/decoding, deciphering, and/or modulation/demodulation, of signal(s) received by the device 510 and signal(s) to be transmitted by the device 510. In some aspects, as described herein, received and transmitted wireless signals can be modulated and/or coded, or otherwise processed, in accordance with one or more radio technology protocols. Such radio technology protocol(s) can include, for example, 3GPP UMTS; 3GPP LTE; LTE-A; Wi-Fi protocols, such as IEEE 802.11 family of standards (IEEE 802.ac, IEEE 802.ax, and the like); IEEE 802.15.4; WiMAX; radio technologies and related protocols for ad hoc networks, such as Bluetooth® or ZigBee®; other protocols for packetized wireless communication; or the like.

The electronic components in the multi-mode communication processing unit 518, including the one or more transmitters/receivers 554, can exchange information (e.g., data, metadata, code instructions, signaling and related payload data, combinations thereof, or the like) through a bus 564, which can embody or can include at least one of a system bus, an address bus, a data bus, a message bus, a reference link or interface, a combination of the foregoing, or the like. Each (or, in some embodiments, at least one) of the one or more receivers/transmitters 554 can convert signal from analog to digital and vice versa. In addition or in the alternative, the receiver(s)/transmitter(s) 554 can divide a single data stream into multiple parallel data streams, or perform the reciprocal operation. Such operations may be conducted as part of various multiplexing schemes. As illustrated, the mux/demux unit 558 is functionally coupled to the one or more receivers/transmitters 554 and can permit processing of signals in time and frequency domain. In some aspects, the mux/demux unit 558 can multiplex and demultiplex information (e.g., data, metadata, and/or signaling) according to various multiplexing schemes such as time division multiplexing (TDM), frequency division multiplexing (FDM), orthogonal frequency division multiplexing (OFDM), code division multiplexing (CDM), space division multiplexing (SDM). In addition or in the alternative, in another aspect, the mux/demux unit 558 can scramble and spread information (e.g., codes) according to most any code, such as Hadamard-Walsh codes, Baker codes, Kasami codes, polyphase codes, and the like. The modem 566 can modulate and demodulate information (e.g., data, metadata, signaling, or a combination thereof) according to various modulation techniques, such as frequency modulation (e.g., frequency-shift keying), amplitude modulation (e.g., M-ary quadrature amplitude modulation (QAM), with M a positive integer; amplitude-shift keying (ASK)), phase-shift keying (PSK), and the like). In addition, processor(s) that can be included in the device 510—e.g., processor(s) 524, or baseband processing circuitry or other type of computing circuitry included in the radio unit 514 or other functional element(s) of the device 510—can permit processing data (e.g., symbols, bits, or chips) for multiplexing/demultiplexing, modulation/demodulation (such as implementing direct and inverse fast Fourier transforms) selection of modulation rates, selection of data packet formats, inter-packet times, and the like.

The codec 562 can operate on information (e.g., data, metadata, signaling, or a combination thereof) in accordance with one or more coding/decoding schemes suitable for communication, at least in part, through the one or more transceivers formed from respective transmitter(s)/receiver(s) 554. In one aspect, such coding/decoding schemes, or related procedure(s), can be retained as computer-accessible instructions (computer-readable instructions, computer-executable instructions, or a combination thereof) in one or more memory devices 534 (collectively referred to as memory 434) and/or other memory device integrated into or otherwise functionally coupled to the radio unit 514. In a scenario in which wireless communication among the device 510 and another computing device (e.g., a station device, other types of user equipment, or customer premises equipment) utilizes MIMO, MISO, SIMO, or SISO operation, the codec 562 can implement at least one of space-time block coding (STBC) and associated decoding, or space-frequency block (SFBC) coding and associated decoding. In addition or in other scenarios, the codec 562 can extract information from data streams coded in accordance with spatial multiplexing scheme. In some aspects, to decode received information (e.g., data, metadata, signaling, or a combination thereof), the codec 562 can implement at least one of computation of log-likelihood ratios (LLR) associated with constellation realization for a specific demodulation; maximal ratio combining (MRC) filtering, maximum-likelihood (ML) detection, successive interference cancellation (SIC) detection, zero forcing (ZF) and minimum mean square error estimation (MMSE) detection, or the like. The codec 562 can utilize, at least in part, mux/demux unit 558 and mod/demod unit 566 to operate in accordance with aspects described herein.

With further reference to FIG. 5A, the device 510 can operate in a variety of wireless environments having wireless signals conveyed in different electromagnetic radiation (EM) frequency bands. To at least such end, the multi-mode communication processing unit 518 in accordance with aspects of the disclosure can process (code, decode, format, etc.) wireless signals within a set of one or more EM frequency bands (also referred to as frequency bands) comprising one or more of radio frequency (RF) portions of the EM spectrum, microwave portion(s) of the EM spectrum, or infrared (IR) portion(s) of the EM spectrum. In one aspect, the set of one or more frequency bands can include, for example, at least one of (i) all or most licensed EM frequency bands, (such as the industrial, scientific, and medical (ISM) bands, including the 2.4 GHz band or the 5 GHz bands); or (ii) all or most unlicensed frequency bands (such as the 60 GHz band) currently available for telecommunication.

As described herein, the device 510 can receive and/or transmit information encoded and/or modulated or otherwise processed in accordance with aspects of the present disclosure. To at least such an end, in some embodiments, the device 510 can acquire or otherwise access information wirelessly via the radio unit 514 (which also may be referred to as radio 514), where at least a portion of such information can be encoded and/or modulated in accordance with aspects described herein. Therefore, in some implementations, the memory 530 also can contain one or more memory elements having information suitable for processing information received according to a predetermined communication protocol (e.g., IEEE 802.11ac, IEEE 802.11ax, IEEE 802.15.4). While not shown, in some embodiments, one or more memory elements (e.g., registers, filed, databases, combinations thereof, or the like) of the memory 434 can include, for example, computer-accessible instructions that can be executed by one or more of the functional elements (units, components, circuitry, etc.) of the device 510 in order to implement at least some of the functionality for configuration of data path groups in a wireless network, in accordance with aspects described herein. One or more groups of such computer-accessible instructions can embody or can constitute a programming interface that can permit communication of information (e.g., data, metadata, and/or signaling) between functional elements of the device 510 for implementation of such functionality.

As further illustrated in FIG. 5A, the device 510 can include one or more I/O interfaces 520. At least one of the I/O interface(s) 520 can permit the exchange of information between the device 510 and another computing device and/or a storage device. Such an exchange can be wireless (e.g., via near field communication or optically-switched communication) or wireline. At least another one of the I/O interface(s) 520 can permit presenting information visually, aurally, and/or via movement to an end-user of the device 510. In one example, a haptic device can embody the I/O interface of the I/O interface(s) 520 that permit conveying information via movement. In addition, in the illustrated device 510, a bus architecture 542 (which also may be referred to as bus 542) can permit the exchange of information (e.g., data, metadata, and/or signaling) between two or more functional elements of the device 510. For instance, the bus 542 can permit exchange of information between two or more of (i) the radio unit 514 or a functional element therein, (ii) at least one of the I/O interface(s) 520, (iii) the communication unit 526, or (iv) the memory 534. In addition, one or more application programming interfaces (APIs) (not depicted in FIG. 5A) or other types of programming interfaces that can permit exchange of information (e.g., data and/or metadata) between two or more of the functional elements of the device 510. At least one of such API(s) can be retained or otherwise stored in the memory 534. In some embodiments, it is noted that at least one of the API(s) or other programming interfaces can permit the exchange of information within components of the communication unit 526. The bus 542 also can permit a similar exchange of information. In some embodiments, the bus 552 can embody or can include, for example, at least one of a system bus, an address bus, a data bus, a message bus, a reference link or interface, a combination thereof, or the like. In addition or in other embodiments, the bus 552 can include, for example, components for wireline and wireless communication.

It is noted that portions of the device 510 can embody or can constitute an apparatus. For instance, the multi-mode communication processing unit 518, the communication unit 526, the data-path-group configuration unit 528, and at least a portion of the memory 434 can embody or can constitute an apparatus that can operate in accordance with one or more aspects of this disclosure.

Figure 6:
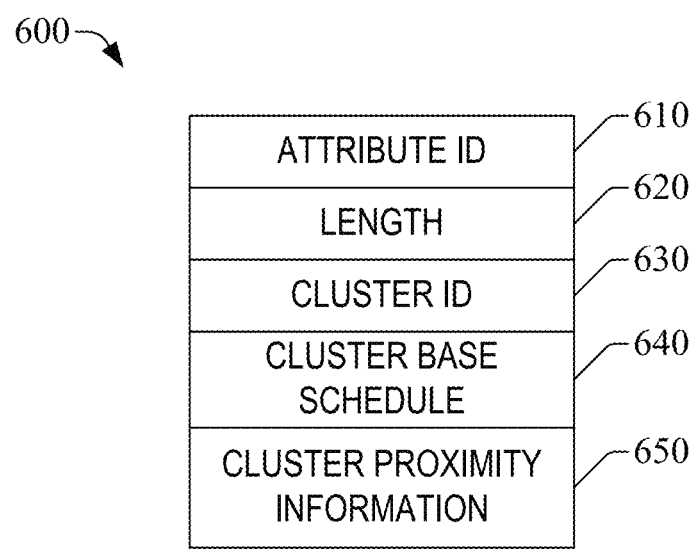
FIG. 6 presents an example of a data structure in accordance with one or more embodiments of the disclosure.

FIG. 6 illustrates an example of an attribute 600 that can be utilized by a communication device to store cluster proximity information for a data path group (e.g., a NAN data cluster) in accordance with one or more embodiments. The exemplified attribute 600 can include several fields (e.g., a first field, a second field, a third field, etc.) having respective sizes (e.g., a number of octets) and respective values (e.g., hexadecimal values). Specifically, the attribute 600 can include an Attribute Identification (ID) field 410 that can identify a general data path group attribute (e.g., an NDC attribute). The Attribute ID field 610 can have a size of one octet and a variable value. The fields in the attribute 400 also can include a Length field 620 having a size of two octets and variable length, where the Length field 620 can be indicative of the lengths of subsequent fields in the attribute 600. In addition or in other implementations, the Length field 620 can include a value indicative of a length of attribute 600. In addition, the fields in the attribute 600 can include a Cluster ID field 630 that can identify a data path group (e.g., an NDC) associated with the attribute 600. In addition or in some embodiments, the attribute 600 can include a Cluster Base Schedule field 640 that can be indicative of a base schedule of the data path group identified by the Cluster ID field 630. Further or in some embodiments, as illustrated, the attribute 600 can include a Cluster Proximity Information field 650 that can include cluster proximity information associated with the data path group identified by the Cluster ID field 630 and/or with another data path group to which the attribute 600 corresponds. It is noted that the disclosure is not limited to the illustrated fields and/or to the particular illustrated arrangement of field. In some embodiments the attribute 600 can include more than five fields or less than five fields, where a field of the attribute 600 includes information indicative or otherwise representative of proximity information of a data path group associated with the attribute 600.

With further reference to FIG. 5A, in various embodiments, the device 510 may determine data path group proximity information 540 associated with a given data path group (e.g., a NAN data cluster) as a function of at least a portion of the link proximity information 538 for data links of a data path group (e.g., NAN data cluster). In some aspects, the data link configuration unit 528 can determine (e.g., compute or otherwise estimate) a value of such a function. In one example, the function can correspond to a minimum function that yields a minimum value of a set of values provided as an argument. Thus, the value determined by the data link configuration unit 528 can be the minimum value of values corresponding to proximity information across the NAN data links. Similarly, in another example, the function can correspond to a maximum function that yield a maximum value of a set of values provided as an argument. Thus, the value determined by the data link configuration unit 528 can be the maximum value of values corresponding to proximity information across the NAN data links. Therefore, in some aspects, the data link configuration unit 528 can determine, using at least a portion of the link proximity information 538 corresponding to a defined NAN data cluster, a maximum observed RSSI with respect to a group of NAN data links of the NAN data cluster. In addition or in other aspects, the data link configuration unit 528 can determine, using at least a portion of the cluster proximity information 538 corresponding to the defined NAN data cluster, a minimum estimated distance value with respect to the group of NAN data links of the NAN data cluster. Further or in yet other aspects, the data link configuration unit 528 can determine a mean RSSI value for a first data link (e.g., a first NAN data link) and a second data link (e.g., a second NAN data link) from the perspective of the device 510.

It is noted that in various embodiments, the device 510 can associate proximity information to a data link and/or a data path group. In some embodiments, the device 510 can generate a data link attribute having a field indicative or otherwise representative of at least a portion of the proximity information. Similarly, the device 510 can generate a data path group attribute (e.g., an NDC attribute) having a field indicative or otherwise representative of at least the portion of the proximity information. In addition or in other embodiments, for example, the device 510 may privately store proximity information for a data link in a record (e.g., a data object or a data structure) for the data link. In various embodiments, such stored proximity information may then be assigned to an established NAN data link associated with that particular data link.

Figure 7A:
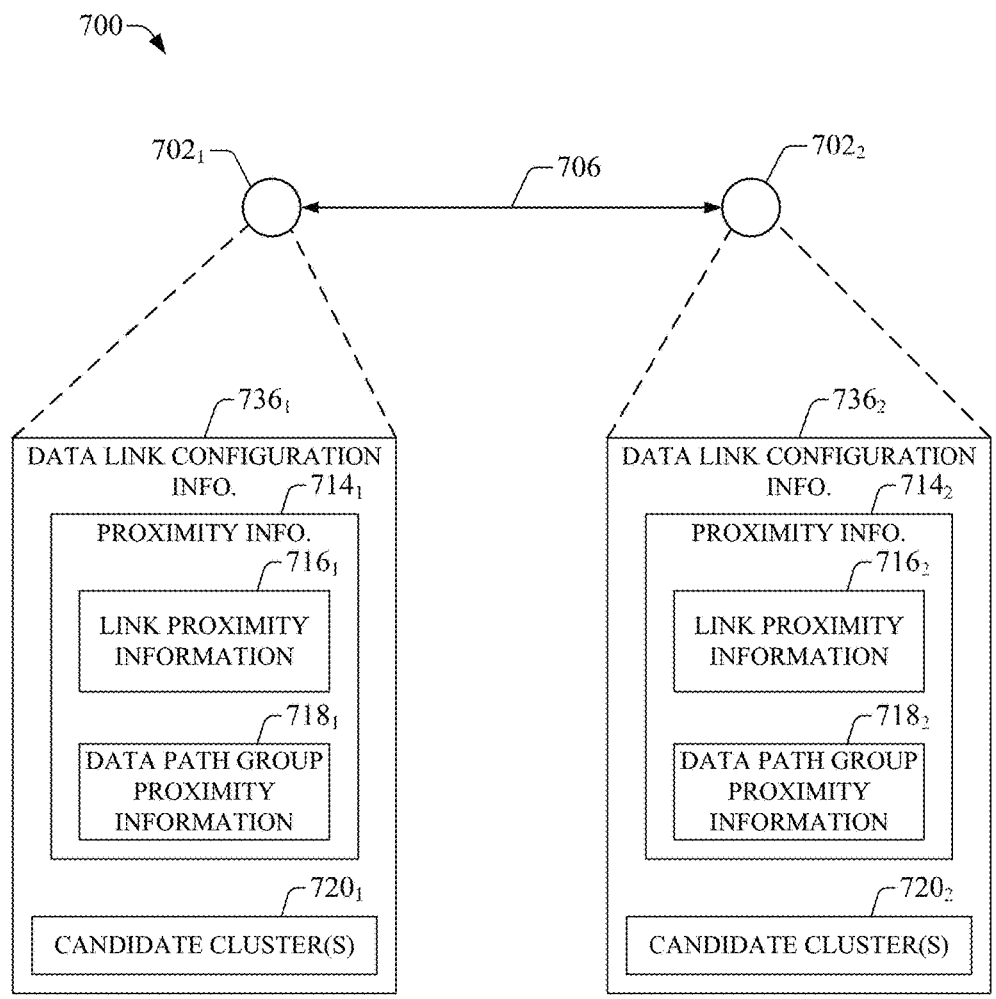
FIG. 7A presents another example of an operational environment in accordance with one or more embodiments of the disclosure.

FIG. 7A illustrates an example of an operational environment 700 that may be representative of the implementation of one or more of the disclosed functionalities for configuration of data links in wireless networks in accordance with one or more embodiments. In the operational environment 700, devices 702$_1$ and 702$_2$ may negotiate with each other in order to identify a data path group (e.g., a NAN data cluster) to which to assign a data link (e.g., a NAN data link) 706. In various embodiments, each of the devices 702$_1$ and 702$_2$ may retain or otherwise maintain respective proximity information 714$_1$ and 714$_2$, which may be the same as or similar to proximity information 536 disclosed in connection with FIG. 5A. In some embodiments, devices 702$_1$ and 702$_2$ may exchange portions of proximity information 714$_1$ and 714$_2$ separately or in conjunction with negotiating the assignment of the data link 706 to a data path group. In various embodiments, proximity information 714$_1$ and 714$_2$ may include respective link proximity information 716$_1$ and 716$_2$, which may be the same as or similar to link proximity information 538 disclosed in connection with FIG. 5A. In some embodiments, proximity information 714$_1$ and 714$_2$ may include respective data path group proximity information 718$_1$ and 718$_2$, which may be the same as or similar to cluster proximity information 540 disclosed in connection with FIG. 5A.

In various embodiments, each of the devices 702$_1$ and 702$_2$ can include similar elements to those of device 510 disclosed in connection with FIG. 5A; elements such as processor(s) 524, memory 530, radio unit 514, communication unit 526, and data link configuration unit 528. As such, in some aspects, device 702$_1$ may identify a set of one or more candidate clusters 720$_1$, and device 702$_2$ may identify a set of one or more candidate clusters 720$_2$. To that end, in one example, each of the devices 702$_1$ and 702$_2$ can leverage a data link configuration unit that can identify such candidate clusters. The data link configuration unit can be embodied in or can constitute the data link configuration unit 528. In some embodiments, candidate clusters 720$_1$ may include each data path group (e.g., NAN data cluster) to which the device $702_1$ belongs upon or after creation of the data link (e.g., a NAN data link) 706 between the device $702_1$ and the device $702_2$. Similarly, candidate clusters $720_2$ may include each data path group (e.g., NAN data cluster) to which the device 7022 belongs upon or after creation of the data link (e.g., NAN data link) 706 between the device $702_1$ and the device $702_2$. Proximity information (e.g., RSSI values, ranging distance values, etc.) for each of the data path groups in the candidate cluster(s) $720_1$ and candidate cluster(s) $720_2$ can be available, respectively, in proximity information $714_1$ and proximity information $714_2$. As described herein, proximity information associated with the data link 706 prior to or after the negotiation process for the generation of the data link 706 also can be available in the proximity information $714_1$ and/or proximity information $714_2$.

Selection or identification of a candidate cluster can be accomplished according to one or more selection criteria, including proximity criteria and/or scheduling criteria. As such, in some scenarios, a data path group (e.g., a NAN data cluster) may be excluded from candidate clusters $720_1$ and/or $720_2$ based at least on a defined proximity criteria or a combination of proximity criteria. In some embodiments, for example, candidate clusters $720_1$ and $720_2$ may include data NAN data clusters for which the associated NDC base schedules constitute subsets of the NDL schedule for the data link 706. In addition or in another example, in various embodiments, candidate clusters $720_1$ and $720_2$ may include data path groups (e.g., NAN data clusters) for which the associated proximity information satisfies a threshold, such as an RSSI threshold, a distance threshold, a channel path loss threshold, a path loss threshold, a combination of two or more of the foregoing thresholds, or the like. Further or in yet another example, in some embodiments, both of candidate clusters $720_1$ and $720_2$ may include data path groups (e.g., NAN data clusters) that are common to devices $702_1$ and $702_2$.

In various embodiments, upon or after determining candidate clusters $720_1$ and $720_2$, the devices $702_1$ and $702_2$ may advertise (e.g., broadcast, multicast, unicast, or otherwise communicate) candidate clusters $720_1$ and $720_2$ to each other individually or in conjunction with negotiating the assignment of the data link 706 to a data path group. In some embodiments, rather than advertising multiple candidate clusters to each other, devices $702_1$ and $702_2$ may each advertise a single data path group to the other. In some aspects, the data path group that is advertised can satisfy a defined proximity criterion or another defined selection rule. In one example, the devices $702_1$ and $702_2$ may identify and advertise respective data path groups (e.g., NAN data clusters) having satisfactory (e.g., the highest, the second highest, etc.) RSSIs or smallest inter-device distance estimates. In another example, the devices $702_1$ and $702_2$ may identify and advertise their closest respective NAN data clusters that feature NDC base schedules that constitute subsets of the NDL schedule for NAN data link 706.

In various embodiments, in negotiating the assignment of the data link 706 to a data path group, devices $702_1$ and $702_2$ may assign the data link 706 to a data path group that satisfies a defined selection criterion (e.g., a proximity criterion) from among candidate data path groups. In addition or in other embodiments, the data path group that is assigned to the data link 706 may be randomly selected from among the candidate data path groups. As such, in some scenarios, the data path group that is assigned to the data link 706 can be have a closest proximity metric, such as a highest RSSI or smallest distance estimate, from among the candidate data path groups. In some embodiments, the defined selection criterion can be embodied in or can include a proximity threshold. Thus, in some implementations, in order to select an assignee data path group, the devices $702_1$ and $702_2$ may apply the proximity threshold, such as an RSSI threshold or a distance threshold, to proximity information respectively available to the devices $702_1$ and $702_2$. One of the data path group(s) that satisfies the proximity threshold can be assigned to the data link 706. A data link configuration unit included in each of the devices 7021 and 7022 can apply the proximity threshold and, based on an outcome of the application of the proximity threshold, the data link configuration unit can assign a data path group to the data link 706. In scenarios in which an extant data path group (e.g., a NAN data cluster) associated with one or both of the devices $702_1$ and $702_2$ does not satisfy the proximity threshold (or, in some embodiments, another selection criterion), a new NAN data cluster may be created and the data link 706 may be assigned to that new data path group. In such scenarios, one of the devices $702_1$ or $702_2$ can generate or otherwise configure the new data path group, and can advertise the new data path group.

Figure 7B:
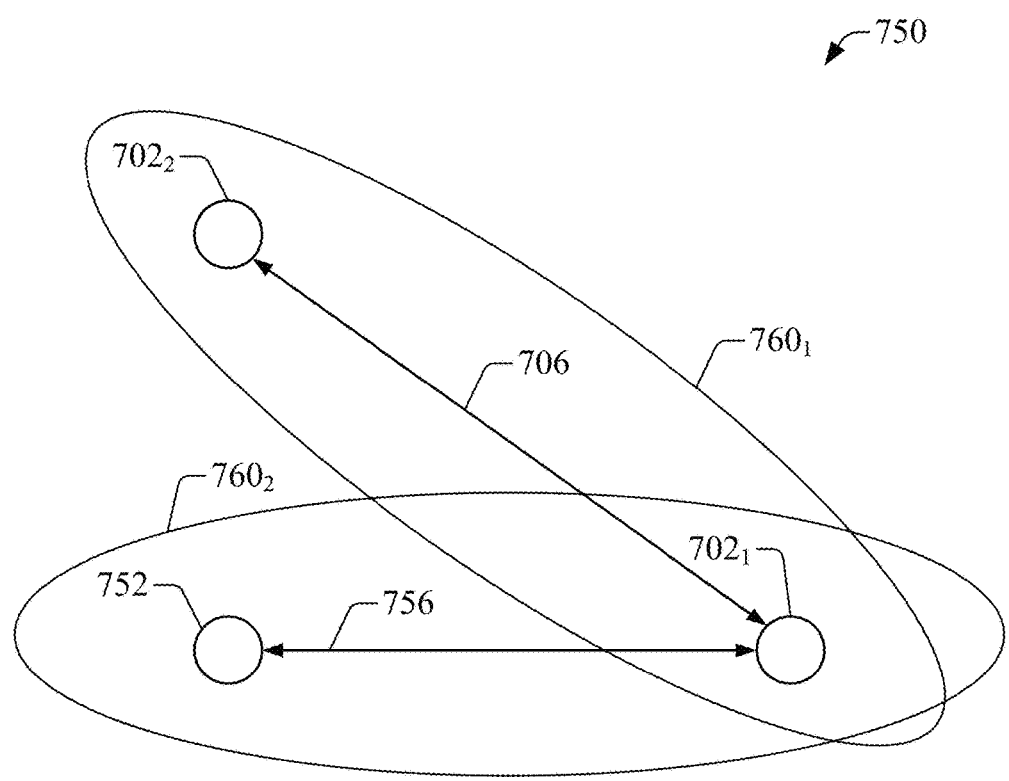
FIG. 7B presents yet another example of an operational environment in accordance with one or more embodiments of the disclosure.

In addition to the assignment of a data path group (e.g., a NDC) to a data link, embodiments of the present disclosure can permit utilizing or otherwise leveraging proximity information to merge or otherwise update existing data path groups (e.g., NDCs) maintained by a device (such as device $702_1$) in accordance with aspects of this disclosure. As an illustration, FIG. 7B presents an example of an operation environment 750 in which devices can operate in accordance with one or more aspects of this disclosure. Specifically, the device $702_1$ can maintain two data path groups $760_1$ and $760_2$ for respective data links (e.g., NDLs); e.g., data path group $760_1$ for data link 706 and data path group $760_2$ for data link 756. Information indicative or otherwise representative of such data path groups, and their relationship to the device $702_1$, can be retained in one or more computer-accessible storage devices within the device $702_1$. In some aspects of group update the device $702_1$ can merge two data links (e.g., NDLs) to the same data path groups (e.g., a NDC) having satisfactory proximity information (e.g., closest proximity information, second closest proximity information, etc.). For instance, the data path group having highest RSSI or the data path group having the shortest distance. In addition or in other aspects of group update, common schedule can be considered in the merging of two or more data path groups. For example, the device $702_1$ can merge two data path groups if both schedules of the data link 706 and the data link 756 include the base schedule of the combined data path group.

Further or in yet other aspects, the device $702_1$ (or any other device in accordance with this disclosure) can utilize or otherwise leverage a threshold of the proximity information. More specifically, for example, two or more data path groups can be merged, by the device $702_1$, for example, if the proximity information satisfies a defined threshold or other type of merger rule. For instance, two data path groups can be merged in response to the RSSI associated with each is higher than a RSSI threshold. For another example, the two data path groups can be merged if the distance is lower than a distance threshold.

Figure 8:
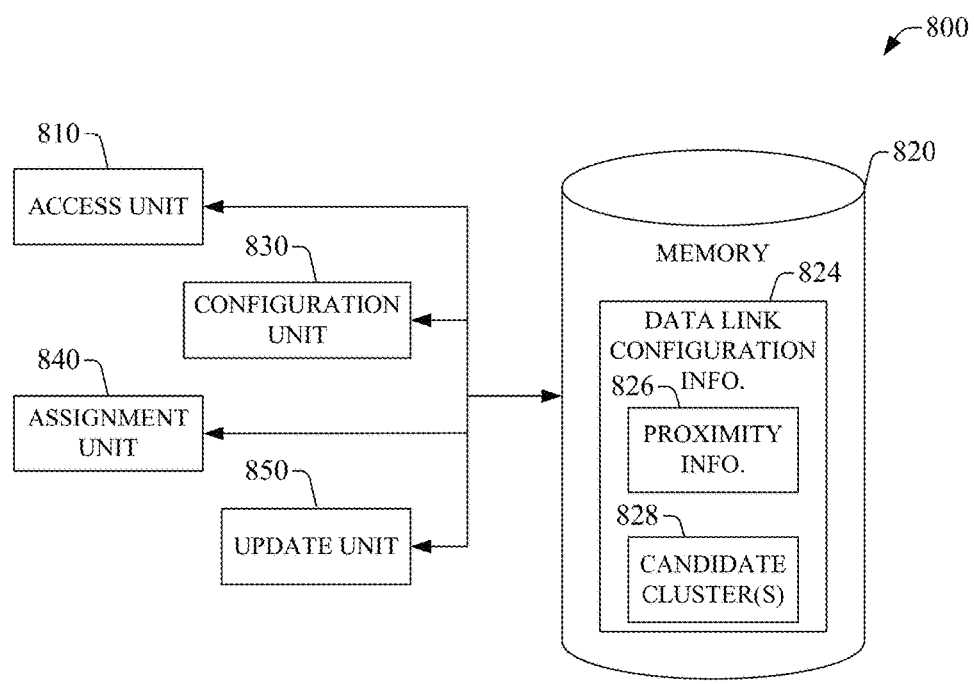
FIG. 8 presents an example of a apparatus in accordance with one or more embodiments of the disclosure.

FIG. 8 illustrates an example of an apparatus 800 for configuration of a data link in accordance with one or more embodiments of this disclosure. The exemplified apparatus 800 includes an access unit 810 that can access proximity information representative or otherwise indicative of an amount of physical separation of a first device from a second device. The first device, the second device, or both, can include the apparatus 800. In order to access proximity information, the access unit 810 can receive information from a communication component (such as the radio unit 514 and/or a communication unit 526), the information can be representative or otherwise indicative of a pilot signal received wirelessly at a device including the apparatus 800. In some implementations, the access unit 810 can process or otherwise operate on at least a portion of the information to determine one or more metrics representative of the amount of physical separation of the first device from the second device. In addition or in another implementation, the access unit 810 can query or poll one or more computer-accessible storage devices 820 (referred to as memory 820) and, in response, the access unit 810 can receive proximity information. Such proximity information can be retained within one or more memory elements 826 (referred to as proximity information 826) within the memory 820. Thus, in some aspects, the access unit 810 can identify proximity information by determining at least one of a RSSI for a wireless signal received from the second device, a channel path loss of the wireless signal, a ranging distance from the second device, or a location of the second device.

The exemplified apparatus 800 also can include a configuration unit 830 that can configure or otherwise generate a data link between a device that includes the apparatus 800 and another device. In addition, the apparatus 800 can include an assignment unit 840 that can assign the data link to a data path group in accordance with aspects described herein. Specifically, in some aspects, the assignment unit 840 can assign or otherwise associate the data link based at least on proximity information accessed by the access unit 810 or otherwise available. As described herein, such proximity information can include first proximity information indicative of an amount of physical separation between a first device and a second device, and/or second proximity information associated with extant data links. The second proximity information can be retained in the proximity information 826 and can be indicative of link proximity information (such as information 538). The second proximity information also can include other proximity information associated with the data path group to which the data link is associated to and/or other data path groups. The proximity information associated with data path group(s) can be retained in the proximity information 826.

In some scenarios, the assignment unit 840 can leverage or otherwise utilize the foregoing proximity information (which can be accessed by the access unit 810 or it can be otherwise available) to select or otherwise identify the data path group (e.g., a NAN data cluster) for association with a data link configured by the configuration unit 830 or an extant data link. To that end, as described herein, the assignment unit 840 can apply one or more selection rules to at least a portion of the available proximity information in order to determine such a data path group. While not shown in FIG. 8, the selection rule(s) can be retained in the memory 820 and can be configurable (either externally or by a device that includes the apparatus 800, for example).

As illustrated in FIG. 8, the apparatus 800 also can include an update unit 850 that can update the proximity information 826. To that end, in some aspects, the update unit 850 can retain proximity information identified or otherwise determined by the access unit 810 in a data structure within the proximity information 826. In some implementations, the proximity information can be retained in the data structure, which can include, for example, an attribute having a field indicative of some or all of the proximity information. In addition or in other aspects, the update unit 850 can modify an extant data structure in order to update proximity information available in the extant data structure. Regardless of the type of update, the update unit 850 also can associate at least a portion of the updated proximity information to a data link configured or otherwise generated by the configuration unit 830 and/or to the data path group associated, by the assignment unit 840, for example, to such a data link. In some implementations, the update unit 850 can retain the proximity information associated with data links as respective data link attributes (e.g., NDL attributes). In addition or in other implementations, the update unit 850 can retain proximity information associated with data path groups as respective data path group attributes, for example. Further or in yet other implementations, to associate proximity information to a data link, the update unit 850 can augment a record (such as a data object or a data structure) indicative or otherwise representative of the data link with data and/or metadata indicative of at least the portion of the proximity information.

While four units are shown as discrete elements constituting the exemplified apparatus 800, the disclosure is not limited in that respect and, in some embodiments, combinations of the access unit 810, the configuration unit 830, the assignment unit 840, and the update unit 850 can constitute the apparatus 800. A combination of two or more of the units 810-850 can be integrated into a single unit. In one example combination, the four units 810-850 can be integrated into a single unit functionally coupled to the memory 820. In other embodiments, one or more of the units 810-850 can be partitioned into sub-units, which can constitute the apparatus 800. As described herein, in some embodiments, each of the units 810-850 or a combination of two or more of such units can be embodied in firmware or other type of circuitry that can provide the functionalities described herein.

Figure 9:
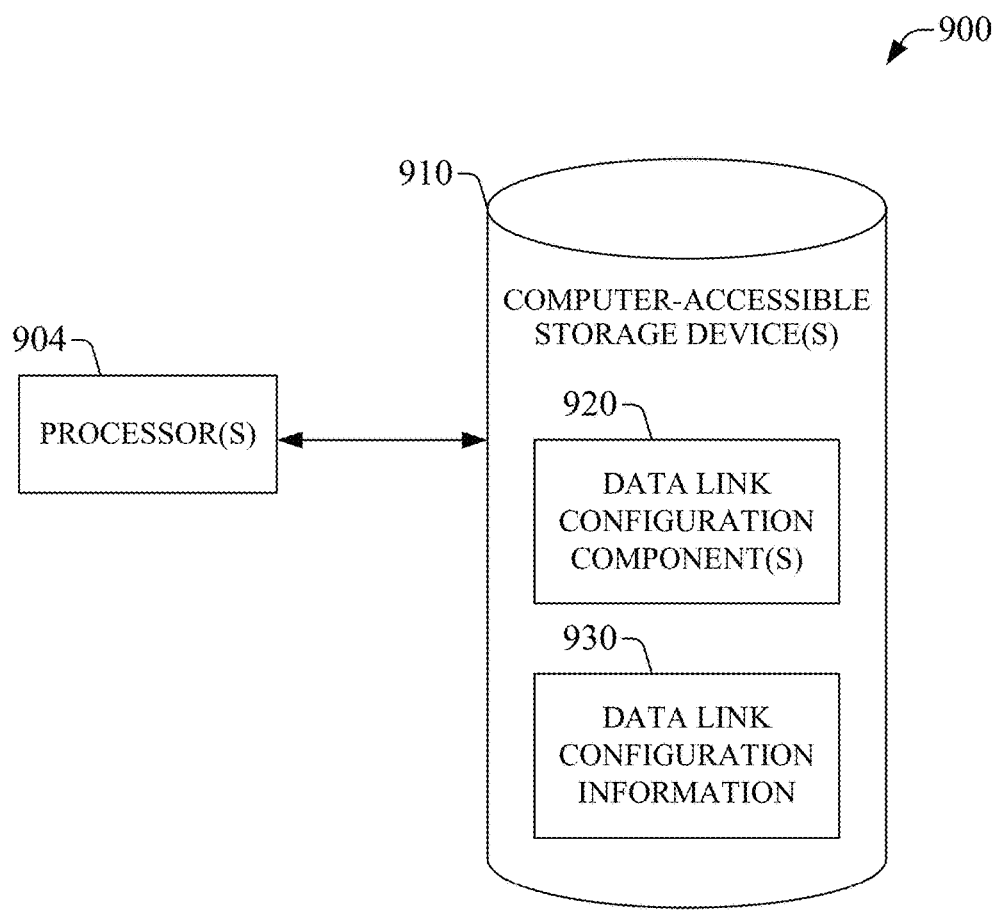
FIG. 9 presents another example of a device in accordance with one or more embodiments of the disclosure.

FIG. 9 presents an example of a device 900 in accordance with one or more embodiments of the disclosure. The exemplified device 900 can include the processor(s) 904 and one or more computer-accessible storage devices 910. At least one of the processor(s) 904 can be similar to or the same as another processor of the processor(s) 524 described herein in connection with the device 510. The computer-accessible storage device(s) 910 can include any non-transitory computer-readable storage medium or machine-readable storage medium, such as an optical, magnetic or semiconductor storage medium. In various embodiments, computer-accessible storage device(s) 910 can embody or can include an article of manufacture. As illustrated, the computer-accessible storage device(s) 910 can retain one or more data link configuration components 920 that can be embodied in or can include computer-executable instructions. The computer-accessible storage device(s) 910 also can retain data link configuration information 930 in accordance with aspects of this disclosure. As such, in some aspects, the data link configuration information 930 can include link proximity information, data path group proximity information, information indicative of candidate data path groups, a combination of the foregoing, or the like. In response to execution, the data link configuration component(s) 920 can perform or otherwise can facilitate operations that permit a device to operate in accordance with aspects described herein. Specifically, in some aspects, the data link configuration component(s) 920 can configure such a device to operate as one of the devices 510, $702_1$, or $702_2$. Examples of a computer-accessible storage medium or machine-readable storage medium may include any tangible media capable of storing electronic data, including volatile memory or non-volatile memory, removable or non-removable memory, erasable or non-erasable memory, writeable or re-writeable memory, and so forth. Examples of computer-executable instructions may include any suitable type of code, such as source code, compiled code, interpreted code, executable code, static code, dynamic code, object-oriented code, visual code, and the like. The embodiments are not limited in this context.

Figure 10:
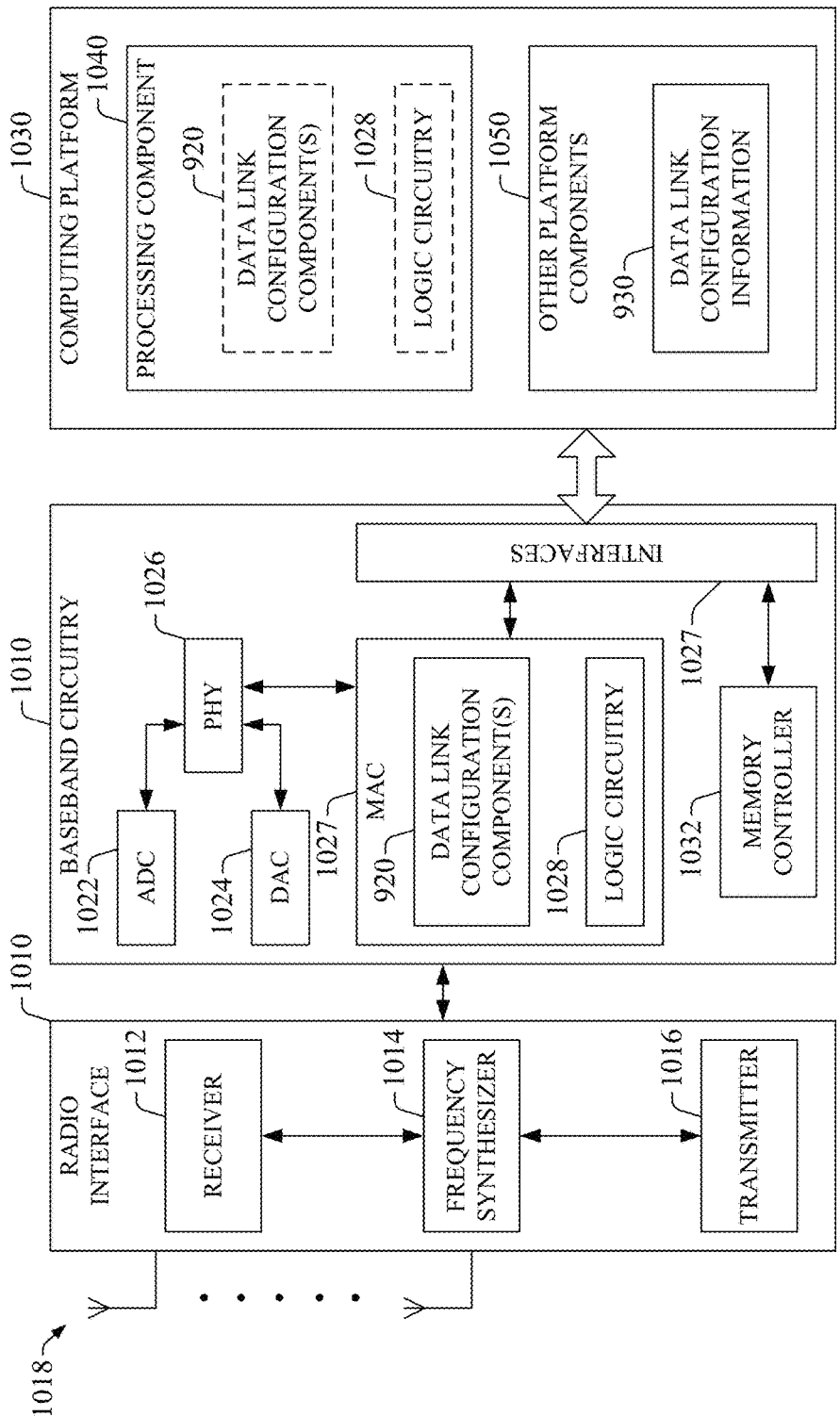
FIG. 10 presents another example of a device in accordance with one or more embodiments of the disclosure.

FIG. 10 illustrates an embodiment of a communications device 1000 that may implement one or more of wireless communication devices 510, $702_1$, $702_2$, and 800. In various embodiments, device 1000 may comprise a logic circuit 1028. The logic circuit 1028 may include physical circuits to perform operations described for one or more of wireless communication devices 510, $702_1$, and $702_2$, for example. As shown in FIG. 10, device 1000 may include a radio interface 1010, baseband circuitry 1020, and computing platform 1030, although the embodiments are not limited to this configuration.

The device 1000 may implement some or all of the structure and/or operations for one or more of wireless communication devices 510, $702_1$, $702_2$, 800, and logic circuit 1028 in a single computing entity, such as entirely within a single device. Alternatively, the device 1000 may distribute portions of the structure and/or operations for one or more of wireless communication devices 510, $702_1$, $702_2$, and 800, and logic circuit 1028 across multiple computing entities using a distributed system architecture, such as a client-server architecture, a 3-tier architecture, an N-tier architecture, a tightly-coupled or clustered architecture, a peer-to-peer architecture, a master-slave architecture, a shared database architecture, and other types of distributed systems. The embodiments are not limited in this context.

In one embodiment, radio interface 1010 may include a component or combination of components adapted for transmitting and/or receiving single-carrier or multi-carrier modulated signals (e.g., including complementary code keying (CCK), orthogonal frequency division multiplexing (OFDM), and/or single-carrier frequency division multiple access (SC-FDMA) symbols) although the embodiments are not limited to any specific over-the-air interface or modulation scheme. Radio interface 1010 may include, for example, a receiver 1012, a frequency synthesizer 1014, and/or a transmitter 1016. Radio interface 1010 may include bias controls, a crystal oscillator and/or one or more antennas 1018. In another embodiment, radio interface 1010 may use external voltage-controlled oscillators (VCOs), surface acoustic wave filters, intermediate frequency (IF) filters and/or RF filters, as desired. Due to the variety of potential RF interface designs an expansive description thereof is omitted.

Baseband circuitry 1020 may communicate with radio interface 1010 to process receive and/or transmit signals and may include, for example, an analog-to-digital converter 1022 for down converting received signals, a digital-to-analog converter 1024 for up converting signals for transmission. Further, baseband circuitry 1020 may include a baseband or physical layer (PHY) processing circuit 1026 for PHY link layer processing of respective receive/transmit signals. Baseband circuitry 1020 may include, for example, a medium access control (MAC) processing circuit 1027 for MAC/data link layer processing. Baseband circuitry 1020 may include a memory controller 1032 for communicating with MAC processing circuit 1027 and/or a computing platform 1030, for example, via one or more interfaces 1034.

In some embodiments, PHY processing circuit 1026 may include a frame construction and/or detection module, in combination with additional circuitry such as a buffer memory, to construct and/or deconstruct communication frames. Alternatively or in addition, MAC processing circuit 1027 may share processing for certain of these functions or perform these processes independent of PHY processing circuit 1026. In some embodiments, MAC and PHY processing may be integrated into a single circuit.

The computing platform 1030 may provide computing functionality for the device 1000. As shown, the computing platform 1030 may include a processing component 1040. In addition to, or alternatively of, the baseband circuitry 1020, the device 1000 may execute processing operations or logic for one or more of wireless communication devices 510, $702_1$, $702_2$, and 800, and logic circuit 1028 using the processing component 1040. The processing component 1040 (and/or PHY 1026 and/or MAC 1027) may comprise various hardware elements, software elements, or a combination of both. Examples of hardware elements may include devices, logic devices, components, processors, microprocessors, circuits, processor circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

The computing platform 1030 may further include other platform components 1050. Other platform components 1050 include common computing elements, such as one or more processors, multi-core processors, co-processors, memory units, chipsets, controllers, peripherals, interfaces, oscillators, timing devices, video cards, audio cards, multimedia input/output (I/O) components (e.g., digital displays), power supplies, and so forth. Examples of memory units may include without limitation various types of computer readable and machine readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information.

Device 1000 may be, for example, an ultra-mobile device, a mobile device, a fixed device, a machine-to-machine (M2M) device, a personal digital assistant (PDA), a mobile computing device, a smart phone, a telephone, a digital telephone, a cellular telephone, user equipment, eBook readers, a handset, a one-way pager, a two-way pager, a messaging device, a computer, a personal computer (PC), a desktop computer, a laptop computer, a notebook computer, a netbook computer, a handheld computer, a tablet computer, a server, a server array or server farm, a web server, a network server, an Internet server, a work station, a mini-computer, a main frame computer, a supercomputer, a network appliance, a web appliance, a distributed computing system, multiprocessor systems, processor-based systems, consumer electronics, programmable consumer electronics, game devices, display, television, digital television, set top box, wireless access point, base station, node B, subscriber station, mobile subscriber center, radio network controller, router, hub, gateway, bridge, switch, machine, or combination thereof. Accordingly, functions and/or specific configurations of device 1000 described herein, may be included or omitted in various embodiments of device 1000, as suitably desired.

Embodiments of device 1000 may be implemented using single input single output (SISO) architectures. However, certain implementations may include multiple antennas (e.g., antennas 1018) for transmission and/or reception using adaptive antenna techniques for beamforming or spatial division multiple access (SDMA) and/or using MIMO communication techniques.

The components and elements of device 1000 may be implemented using any combination of discrete circuitry, application specific integrated circuits (ASICs), logic gates and/or single chip architectures. Further, the elements of device 1000 may be implemented using microcontrollers, programmable logic arrays and/or microprocessors or any combination of the foregoing where suitably appropriate. It is noted that hardware, firmware and/or software elements may be collectively or individually referred to herein as a "component," which can include "logic" and/or "circuit."

It noted that the example device 1000 shown in the block diagram of FIG. 10 may represent one example of many potential implementations of aspects of this disclosure. Accordingly, division, omission or inclusion of block functions depicted in the accompanying figures does not infer that the hardware components, circuits, software and/or elements for implementing these functions would be necessarily be divided, omitted, or included in embodiments.

Figure 11:
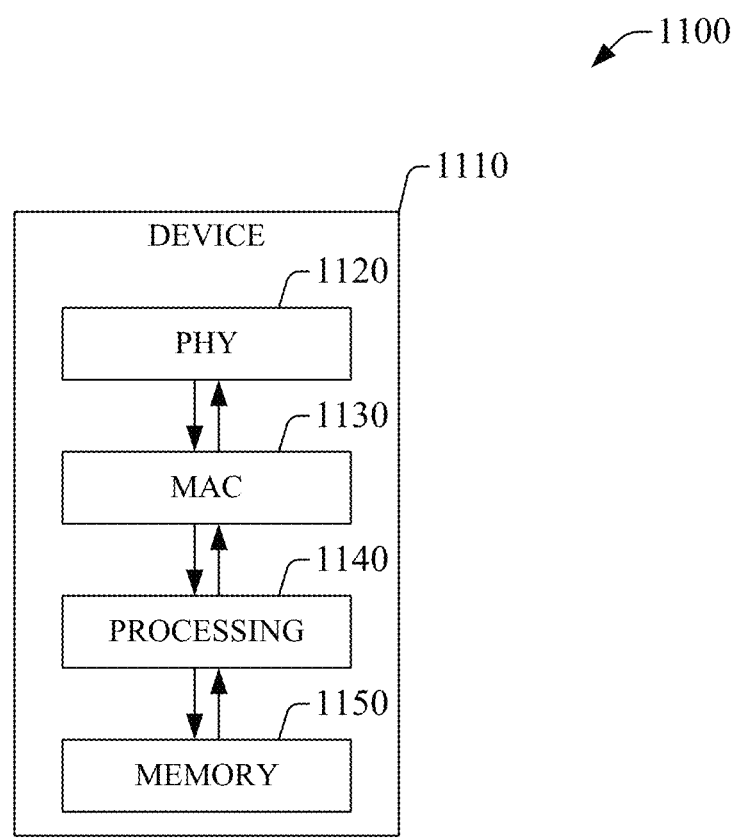
FIG. 11 presents another example of a device in accordance with one or more embodiments of the disclosure.

FIG. 11 presents another example embodiment of a device 1110 in accordance with one or more embodiments of the disclosure. The device 1110 can embody or can constitute, for example, one of the communication devices 110*a*, 110*b*, or 110*c*; one or more of the base stations 114*a*, 114*b*, or 114*c*; and/or any other devices (e.g., device 510) that can implement or otherwise leverage configuration of data path groups in accordance with aspects described herein. In some embodiments, the device 1110 can embody or can constitute any one of the devices in a low-power mesh network, such as the example mesh network 220 shown in FIG. 2. As such, the device 1110 can embody a border router device, a router device, a leader device, or a SED. Therefore, in some implementations, the device 1110 can be a device compliant with IEEE 802.15.4, Thread, and/or NAN protocols, where the device may be configured to communicate with one or more other similarly compliant devices and/or other types of communication devices, such as legacy communication devices. In addition or in other embodiments, the device 1110 can be compliant with Wi-Fi protocols and/or Thread protocols. Devices compliant with IEEE 802.15.4 and/or Thread protocols may be broadly referred to as Thread devices and can operate in accordance with aspects described herein. As mentioned, Thread devices, such as border router devices, also may operate in accordance with Wi-Fi protocols. In one implementation, the device 1110 can operate as a commissioner device, a border router device, a leader device, a router device, or a SED.

As illustrated, the device 1110 can include, among other things, physical layer (PHY) circuitry 1120 and media access control layer (MAC) circuitry 1130. In one aspect, the PHY circuitry 1120 and the MAC circuitry 1130 can be layers compliant with IEEE 802.15.4 and/or Thread protocols, and also can be compliant, in some embodiments, with one or more Wi-Fi protocols, such as one or more of NAN protocols and/or or protocol(s) of the family of IEEE 802.11 standards. In one aspect, the MAC circuitry 1130 can be arranged to configure physical layer converge protocol (PLCP) protocol data units (PPDUs) and arranged to transmit and receive PPDUs, among other things. In addition or in other embodiments, the device 1110 also can include other hardware processing circuitry 1140 (e.g., one or more processors) and one or more memory devices 1150 (which can be collectively referred to as memory 1150) configured to perform the various operations for configuration of data path groups as described herein.

In some embodiments, the MAC circuitry 1030 can be arranged to contend for a wireless medium during a contention period to receive control of the medium for a control period and configure a PPDU. In addition or in other embodiments, the PHY circuitry 1120 can be arranged to transmit the PPDU. The PHY circuitry 1120 can include circuitry for modulation/demodulation, upconversion/downconversion, filtering, amplification, etc. As such, the device 1110 can include a transceiver to transmit and receive data such as PPDU. In some embodiments, the hardware processing circuitry 1140 can include one or more processors. The hardware processing circuitry 1140 can be configured to perform functions based on instructions being stored in a memory device (e.g., volatile random access memory (RAM), non-volatile RAM, or read only memory (ROM)) or based on special purpose circuitry. In some embodiments, the hardware processing circuitry 1140 can be configured to perform one or more of the functions described herein, such as allocating bandwidth or receiving allocations of bandwidth.

In some embodiments, one or more antennas may be coupled to or included in the PHY circuitry 1120. The antenna(s) can transmit and receive wireless signals, including transmission of HEW packets or other type of radio packets. As described herein, the one or more antennas can include one or more directional or omnidirectional antennas, including dipole antennas, monopole antennas, patch antennas, loop antennas, microstrip antennas or other types of antennas suitable for transmission of RF signals. In scenarios in which MIMO communication is utilized, the antennas may be physically separated to leverage spatial diversity and the different channel characteristics that may result.

The memory 1150 can retain or otherwise store information for configuring the other circuitry to perform operations for configuring and transmitting packets compliant with Thread protocols and/or other types of radio packets, and performing the various operations described herein including, for example, configuring a data path group in accordance with one or more embodiments of this disclosure. The memory 1150 can include any type of memory devices, including non-transitory storage media, for storing information in a form readable by a machine (e.g., a computer or another type of computing device). As an illustration, the memory 1150 can include at least one computer-readable storage device, such as ROM device(s), RAM device(s), magnetic disk storage media, optical storage media, flash-memory device(s), and other storage devices and media.

The device 1110 can be configured to communicate using OFDM communication signals over a multicarrier communication channel. More specifically, in some embodiments, the device 1110 can be configured to communicate in accordance with one or more specific radio technology protocols, such as the IEEE family of standards including IEEE 802.11, IEEE 802.11n, IEEE 802.11ac, IEEE 802.11ax, IEEE 802.15.4, DensiFi, and/or proposed specifications for WLANs. In one of such embodiments, the device 1110 can utilize or otherwise rely on symbols having a duration that is four times the symbol duration of IEEE 802.11n and/or IEEE 802.11ac. It is noted that the disclosure is not limited in this respect and, in some embodiments, the device 1110 also can transmit and/or receive wireless communications in accordance with other protocols and/or standards.

The device 1110 can be embodied in or can constitute a portable wireless communication device, such as a personal digital assistant (PDA), a laptop or portable computer with wireless communication capability, a web tablet, a wireless telephone, a smartphone, a wireless headset, a pager, an instant messaging device, a digital camera, an access point, a television, a medical device (e.g., a heart rate monitor, a blood pressure monitor, etc.), an access point, a base station, a transmit/receive device for a wireless standard such as IEEE 802.11, IEEE 802.15.4, or IEEE 802.16, or other types of communication device that may receive and/or transmit information wirelessly. Similarly to other devices of this disclosure, the device 1110 can include, for example, one or more of a keyboard, a display, a non-volatile memory port, multiple antennas, a graphics processor, an application processor, speakers, and other mobile device elements. The display may be an LCD screen including a touch screen.

It is noted that while the device 1110 is illustrated as having several separate functional elements, one or more of the functional elements may be combined and may be implemented by combinations of software-configured elements, such as processing elements including digital signal processors (DSPs), and/or other hardware elements. For example, some elements may comprise one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In some embodiments, the functional elements may refer to one or more processes operating or otherwise executing on one or more processors. It is further noted that portions of the device 1110 can embody or can constitute an apparatus. For instance, the processing circuitry 1140 and the memory 1150 can embody or can constitute an apparatus that can operate in accordance with one or more aspects of this disclosure. The apparatus also can include functional elements (e.g., a bus architecture and/or API(s) as described herein) that can permit exchange of information between the processing circuitry 1140 and the memory 1150.

In view of the functionalities described herein in accordance with this disclosure, various techniques can be implemented for configuring data path groups associated with a cluster of devices that can communicate wirelessly and can operate according to a specific communication protocol (e.g., an IEEE 802.11 standardized protocol). Example of such techniques can be better appreciated with reference, for example, to the flowchart in FIG. 12. For purposes of simplicity of explanation, the example method disclosed herein is presented and described as a series of blocks (with each block representing one or more actions or operations, for example). However, it is to be understood and appreciated that the illustrated method is not limited by the order of blocks and associated actions or operations, as some blocks may occur in different orders and/or concurrently with other blocks from those that are shown and described herein. For example, the various methods (or processes or techniques) in accordance with this disclosure can be alternatively represented as a series of interrelated states or events, such as in a state diagram. Furthermore, not all illustrated blocks, and associated action(s), may be required to implement a method in accordance with one or more aspects of the disclosure. Further yet, two or more of the disclosed methods or processes, or functionalities described herein in connection with adaptive mid-packet detection, can be implemented in combination with each other in order to accomplish one or more of the elements or advantages of this disclosure.

It is noted that the techniques of this disclosure can be retained on an article of manufacture, or computer-readable medium, to permit or facilitate transporting and transferring such methods to a computing device (e.g., a desktop computer; a mobile computer, such as a tablet, or a smartphone; a gaming console, a mobile telephone; a blade computer; a programmable logic controller, and the like) for execution, and thus implementation, by a processor of the computing device or for storage in a memory thereof or functionally coupled thereto. In one aspect, one or more processors, such as processor(s) that implement (e.g., execute) one or more of the disclosed techniques, can be employed to execute code instructions retained in a memory, or any computer- or machine-readable medium, to implement the one or more methods. The code instructions can provide a computer-executable or machine-executable framework to implement the techniques described herein.

Figure 12:
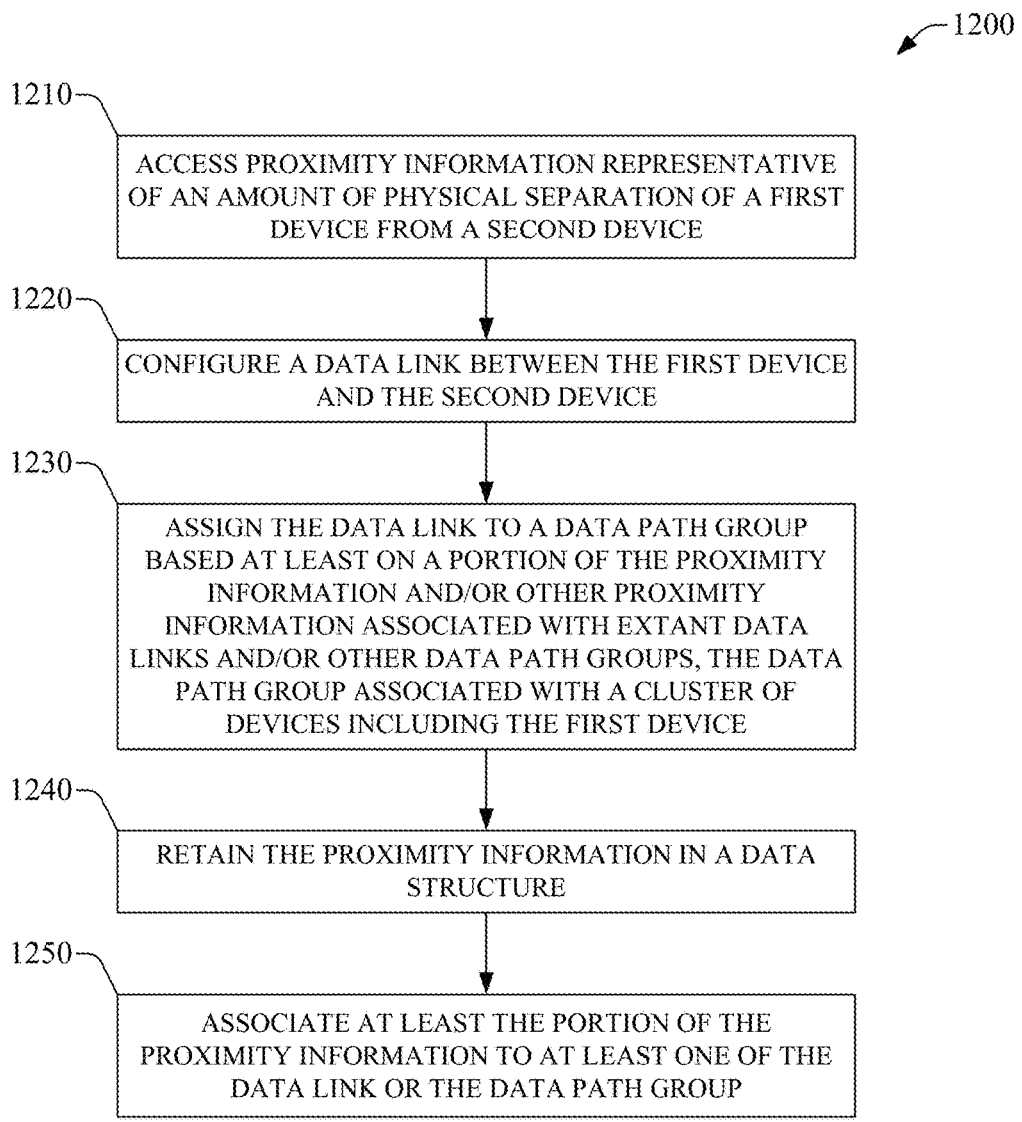
FIG. 12 presents an example method in accordance with one or more embodiments of the disclosure.

FIG. 12 presents an example method 1200 for setting up data links in data path groups according to one or more embodiments of the disclosure. At least a portion of the example method 1200 can be implemented by a device in accordance with aspects of this disclosure. The device can include computing resources and communication resources that can permit, at least, wireless communication between the device and another device. The computing resources can include, for example, one or more processors and one or more computer-accessible storage devices. The communication resources can include one or more antennas and circuitry (or, in some embodiments, other components) that can permit processing analog information and/or digital information for, at least, the wireless communication between the device and the other device. At least a portion of the analog information and/or at least a portion of the digital information can be processed according to a radio technology protocol, as described herein. At least some of the computing resources and/or at least some of the communication resources can implement one or more blocks of the example method 1200.

At block 1210, a first device can access or otherwise determine proximity information representative of an amount of physical separation of the first device from a second device. In certain implementations, the proximity information can be accessed as part of or in response to a negotiation process associated with generation of a data link (e.g., NAN data link) between the first device and another device (e.g., the second device, a third device, or the like). As such, in some aspects, accessing the proximity information can include, for example, receiving information wirelessly (e.g., a pilot signal) and, utilizing at least a portion of the information, determining one or more metrics representative of the amount of physical separation of the first device from the second device. In addition or in another example, accessing proximity information can include querying or polling a computer-accessible storage device integrated into or otherwise coupled to the first device and, in response, receiving the proximity information. As such, in some aspects, accessing or otherwise identifying the proximity information can include determining at least one of a RSSI for a wireless signal received from the second device, a channel path loss of the wireless signal, a ranging distance from the second device, or a location of the second device.

At block 1220, the first device can configure or otherwise generate the data link between the first device and the second device. At block 1230, the first device can assign the data link to a data path group. In some aspects, the data link can be assigned based at least on a portion of the proximity information. As described herein, the assignment of the data link also is based on other proximity information associated with extant data links (e.g., link proximity information 538) and/or yet other proximity information associated with the data path group or other data path groups (e.g., data path group proximity information 540). The data path group can be embodied in or can include a NAN data cluster associated with a cluster of devices. As described herein, assigning the data link to a data path group according, at least in part, to proximity information associated with devices that form a data link and/or proximity information associated with another link or the data path group can mitigate or can avoid reliance on multi-hop management in order to maintain stringent synchronization between devices associated with the data path group. Therefore, in some aspects, implementation of the example method 1200 can reduce complexity in the configuration of data links and data path groups in wireless networks.

With further reference to the example method 1200, at block 1240, the first device can retain the proximity information in a data structure within one or more computer-accessible storage devices (e.g., memory 530 in device 510). In some implementations, a portion of the proximity information can be retained in the data structure, which can include, for example, an attribute having a field indicative of some or all of the proximity information. At block 1250, the first device can associate at least the portion of the proximity information to at least one of the data link or the data path group. As such, in some aspects, proximity information associated with data links (e.g., link proximity information 538) can be retained at the first device as respective data link attributes (e.g., NDL attributes), for example. In addition, or in other aspects, proximity information associated with data path groups (e.g., data path group proximity information) can be retained at the first device as respective data path group attributes, for example. In addition or in some implementations, associating at least the portion of the proximity information to a data link can include augmenting a record (such as a data object or a data structure) indicative of or otherwise representative of the data link with data and/or metadata indicative of at least the portion of the proximity information.

According to example embodiments of the disclosure, there may be a computer-readable storage device. The computer-readable storage device may have instructions programmed thereon that, in response to execution, cause a first device to perform or facilitate operations comprising: accessing proximity information representative of an amount of separation of the first device from a second device; configuring a data link with the second device; and assigning, based at least on the portion of the first proximity information, the data link to an extant data path group associated with a cluster of devices including the first device.

Implementation may include one or more of the following elements. Accessing the proximity information may comprise operations determining at least one of a received signal strength indicator (RSSI) for a wireless signal received from the second device, a channel path loss of the wireless signal, a ranging distance from the second device, or a location of the second device. The at least one computer-readable storage device may further perform operations comprising retaining at least a portion of the proximity information in a data structure within the device. The data structure may comprise an attribute having a field indicative of the at least the portion of the proximity information and may further perform operations comprising associating the attribute to the data link and the data path. Operations may further comprise assigning second proximity information representative of a second amount of physical separation of the first device from a third device, operations may further comprise configuring a second data link; and assigning, based at least on a second portion of the second proximity information and the first proximity information, the second data link to the extant data path group. A value of a defined function of the first proximity information and second proximity information may be determined by operations and may be further determined by updating the data structure to include the value; and associating the value to the extant data path group. Assignation may further comprise operations determining that the extant data path group has a base schedule that is a subset of the second schedule of the data link; determining that the second device in included in the cluster of devices associated with the extant data path group. The operations of the at least one computer-readable storage device may further comprise receiving information indicative of the data path group prior to the assigning. Assigning may further comprise determining that a portion of the proximity information satisfies a proximity criterion; identifying the data path group by determining that the data path group is associated with the portion of the proximity information. Operations may further comprise accessing link information indicative of data links respectively associated with data path groups, each of the data groups associated with a respective cluster of devices; accessing proximity information associated with the data path groups; determine that a first data path group of the data path groups is associated with first proximity information that satisfies a proximity criterion; and assigning at least a subset of the data links to the first data path group. The at least one computer-readable storage device may further perform operations determining a first data link of the data links has a first base schedule that includes a base schedule of a second data path group of the data path groups; determining that a second data link of the data links has a second base schedule that includes the base schedule; and assigning the first data link and the second data link to the second data path group.

According to example embodiments of the disclosure, there may be a device. The device may include at least one memory device having instructions programmed thereon and at least one processor configured to access the at least one memory device and further configured to execute the instructions to: identify proximity information representative of an amount of separation of the device from a second device; configure a data link with the second device; and assign, based at least on the portion of the first proximity information, the data link to an extant data path group associated with a cluster of devices including the first device. In some embodiments, the device can include a radio unit that receives wireless signal from the second device according to a defined radio technology protocol, the radio unit comprising at least one transceiver and at least one antenna; and Implementation may include one or more of the following elements. The data link can include a Neighbor Awareness Networking (NAN) data link, and wherein the data path group comprises a NAN data cluster. To identify the proximity information, the at least one processor can be coupled to the radio unit and can be further configured to execute the instructions to determine at least one of a received signal strength indicator (RSSI) for a wireless signal received from the second device, a channel path loss of the wireless signal, a ranging distance from the second device, or a location of the second device. The device may further configure the processor to execute the instructions to retain at least a portion of the proximity information in a data structure within the device. The data structure may comprise an attribute having a field indicative of the at least the portion of the proximity information and the device may further configure the processor to execute the instructions to associate the attribute to the data link and the data path. The at least one processor of the device may further be configured to execute the instructions to access second proximity information representative of a second amount of physical separation of the first device from a third device, and may further execute instructions to configure a second data link; and to assign based at least on a second portion of the second proximity information and the first proximity information, the second data link to the extant data path group. A value of a defined function of the first proximity information and second proximity information may be determined by executed instructions by the configured processor and may be further determined by updating the data structure to include the value; and associating the value to the extant data path group. Assignation may further comprise determining that the extant data path group has a base schedule that is a subset of a second schedule of the data link. The at least one processor of the device may further be configured to execute the instructions to determine that the second device in included in the cluster of devices associated with the extant data path group. The at least one processor of the device may further be configured to execute the instructions to receive information indicative of the data path group prior to the assigning. The at least one processor of the device may further be configured to execute the instructions to determine that a portion of the proximity information satisfies a proximity criterion; to identify the data path group by determining that the data path group is associated with the portion of the proximity information. The at least one processor of the device may further be configured to execute the instructions to access link information indicative of data links respectively associated with data path groups, each of the data groups associated with a respective cluster of devices; to determine that a first data path group of the data path groups is associated with first proximity information that satisfies a proximity criterion; and to assign at least a subset of the data links to the first data path group. The at least one processor may further be configured to execute the instructions to determine that a first data link of the data links has a first base schedule that includes a base schedule of a second data path group of the data path groups; to determine that a second data link of the data links has a second base schedule that includes the base schedule; and to assign the first data link and the second data link to the second data path group.

According to example embodiments of the disclosure, there may be a method. The method may comprise: accessing proximity information representative of an amount of separation of the first device from a second device; configuring a data link with the second device; and assigning, based at least on the portion of the first proximity information, the data link to an extant data path group associated with a cluster of devices including the first device.

Implementation may include one or more of the following elements. Accessing the proximity information may comprise operations determining at least one of a received signal strength indicator (RSSI) for a wireless signal received from the second device, a channel path loss of the wireless signal, a ranging distance from the second device, or a location of the second device. The method may further perform operations comprising retaining at least a portion of the proximity information in a data structure within the device. The data structure may comprise an attribute having a field indicative of the at least the portion of the proximity information and the method may further perform operations comprising associating the attribute to the data link and the data path. Operations may further comprise assigning second proximity information representative of a second amount of physical separation of the first device from a third device, operations may further comprise configuring a second data link; and assigning, based at least on a second portion of the second proximity information and the first proximity information, the second data link to the extant data path group. A value of a defined function of the first proximity information and second proximity information may be determined by operations and may be further determined by updating the data structure to include the value; and associating the value to the extant data path group. Assignation may further comprise operations determining that the extant data path group has a base schedule that is a subset of the second schedule of the data link; determining that the second device in included in the cluster of devices associated with the extant data path group. The operations of the method further comprise receiving information indicative of the data path group prior to the assigning. Assigning may further comprise determining that a portion of the proximity information satisfies a proximity criterion; identifying the data path group by determining that the data path group is associated with the portion of the proximity information. Operations may further comprise accessing link information indicative of data links respectively associated with data path groups, each of the data groups associated with a respective cluster of devices; accessing proximity information associated with the data path groups; determine that a first data path group of the data path groups is associated with first proximity information that satisfies a proximity criterion; and assigning at least a subset of the data links to the first data path group. The method may further perform operations determining a first data link of the data links has a first base schedule that includes a base schedule of a second data path group of the data path groups; determining that a second data link of the data links has a second base schedule that includes the base schedule; and assigning the first data link and the second data link to the second data path group.

The disclosure also can provide, in some embodiments, a device including an access unit that identifies proximity information representative of an amount of physical separation of the device from a second device; a configuration unit that configures a data link with the second device; and an assignment unit that associates, based on a portion of the proximity information and at least one of second proximity information associated with extant data links or third proximity information associated with data path groups, the data link to a data path group associated with a cluster of devices including the device. In addition or in other embodiments, the device can further include a radio unit that receives wireless signal from the second device according to a defined radio technology protocol, the radio unit comprising at least one transceiver and at least one antenna; and a communication unit coupled to the radio unit, the communication unit generates information representative of the wireless signal.

Implementation may include one or more of the following elements. In order to identify the proximity information, the access unit receives at least a portion of the information, and determines, using at least the portion of the information, at least one of a received signal strength indicator (RSSI) for the wireless signal, a channel path loss of the wireless signal, a ranging distance from the second device, or a location of the second device.

According to example embodiments of the disclosure, there may be an apparatus. The apparatus may comprise: means for accessing proximity information representative of an amount of separation of the first device from a second device; means for configuring a data link with the second device; and means for assigning, based at least on the portion of the first proximity information, the data link to an extant data path group associated with a cluster of devices including the first device.

Implementation may include one or more of the following elements. Means for accessing the proximity information may comprise means for determining at least one of a received signal strength indicator (RSSI) for a wireless signal received from the second device, a channel path loss of the wireless signal, a ranging distance from the second device, or a location of the second device. The apparatus may further perform operations comprising means for retaining at least a portion of the proximity information in a data structure within the device. The data structure may comprise an attribute having a field indicative of the at least the portion of the proximity information and the apparatus may further perform operations comprising means for associating the attribute to the data link and the data path. Operations may further comprise means for assigning second proximity information representative of a second amount of physical separation of the first device from a third device, operations may further comprise means for configuring a second data link; and means for assigning, based at least on a second portion of the second proximity information and the first proximity information, the second data link to the extant data path group. The apparatus may have means for determining a value of a defined function of the first proximity and the second proximity information; means for updating the data structure to include the value; and means for associating the value to the extant data path group. Means for assignation may further comprise means for determining that the extant data path group has a base schedule that is a subset of the a second schedule of the data link; means for determining that the second device in included in the cluster of devices associated with the extant data path group. The apparatus may further comprise means for receiving information indicative of the data path group prior to the assigning. Means for assigning may further comprise means for determining that a portion of the proximity information satisfies a proximity criterion; means for identifying the data path group by determining that the data path group is associated with the portion of the proximity information. The apparatus may further comprise means for accessing link information indicative of data links respectively associated with data path groups, each of the data groups associated with a respective cluster of devices; means for accessing proximity information associated with the data path groups; means for determining that a first data path group of the data path groups is associated with first proximity information that satisfies a proximity criterion; and means for assigning at least a subset of the data links to the first data path group. The apparatus may further perform operations comprising means for determining a first data link of the data links has a first base schedule that includes a base schedule of a second data path group of the data path groups; means for determining that a second data link of the data links has a second base schedule that includes the base schedule; and means for assigning the first data link and the second data link to the second data path group.

Various embodiments of the disclosure may take the form of an entirely or partially hardware embodiment, an entirely or partially software embodiment, or a combination of software and hardware (e.g., a firmware embodiment). Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. As described herein, various embodiments of the disclosure (e.g., methods and/or systems) may take the form of a computer program product comprising a computer-readable non-transitory storage medium having computer-accessible instructions (e.g., computer-readable and/or computer-executable instructions) such as computer software, encoded or otherwise embodied in such storage medium. Those instructions can be read or otherwise accessed and executed by one or more processors to perform or permit performance of the operations described herein. The instructions can be provided in any suitable form, such as source code, compiled code, interpreted code, executable code, static code, dynamic code, assembler code, combinations of the foregoing, and the like. Any suitable computer-readable non-transitory storage medium may be utilized to form the computer program product. For instance, the computer-readable medium may include any tangible non-transitory medium for storing information in a form readable or otherwise accessible by one or more computers or processor(s) functionally coupled thereto. Non-transitory storage media can include ROM device(s); RAM device(s); magnetic disk storage media; optical storage media; flash memory device(s); resistive memory device(s); etc. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor. Some embodiments may be implemented, for example, using a machine-readable medium or article which may store an instruction or a set of instructions that, if executed by a machine, may cause the machine to perform a method and/or operations in accordance with the embodiments. Such a machine may include, for example, any suitable processing platform, computing platform, computing device, processing device, computing system, processing system, computer, processor, or the like, and may be implemented using any suitable combination of hardware and/or software. The machine-readable medium or article may include, for example, any suitable type of memory unit, memory device, memory article, memory medium, storage device, storage article, storage medium and/or storage unit, for example, memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of Digital Versatile Disk (DVD), a tape, a cassette, or the like. The instructions may include any suitable type of code, such as source code, compiled code, interpreted code, executable code, static code, dynamic code, encrypted code, and the like, implemented using any suitable high-level, low-level, object-oriented, visual, compiled and/or interpreted programming language.

Numerous specific details have been set forth herein to provide a thorough understanding of the embodiments. It will be understood by those skilled in the art, however, that the embodiments may be practiced without these specific details. In other instances, well-known operations, components, and circuits have not been described in detail so as not to obscure the embodiments. It can be appreciated that the specific structural and functional details disclosed herein may be representative and do not necessarily limit the scope of the embodiments.

Some embodiments may be described using the expression "coupled" and "connected" along with their derivatives. Specifically, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other. In addition, as used in the present specification and annexed drawings, the term "communicate" is intended to include transmitting, or receiving, or both transmitting and receiving. This may be particularly useful in claims when describing the organization of data that is being transmitted by one device and received by another, but only the functionality of one of those devices is required to infringe the claim. Similarly, the bidirectional exchange of data between two devices (both devices transmit and receive during the exchange) may be described as "communicating," when only the functionality of one of those devices is being claimed. The term "communicating" as used herein with respect to a wireless communication signal includes transmitting the wireless communication signal and/or receiving the wireless communication signal. For example, a wireless communication unit, which is capable of communicating a wireless communication signal, may include a wireless transmitter to transmit the wireless communication signal to at least one other wireless communication unit, and/or a wireless communication receiver to receive the wireless communication signal from at least one other wireless communication unit.

Unless specifically stated otherwise, it may be appreciated that terms such as "processing," "computing," "calculating," "determining," or the like, refer to the action and/or processes of a computer or computing system, or similar electronic computing device, that manipulates and/or transforms data represented as physical quantities (e.g., electronic) within the computing system's registers and/or memories into other data similarly represented as physical quantities within the computing system's memories, registers or other such information storage, transmission or display devices. The embodiments are not limited in this context.

It should be noted that the methods described herein do not have to be executed in the order described, or in any particular order. Moreover, various activities described with respect to the methods identified herein can be executed in serial or parallel fashion.

Although specific embodiments have been illustrated and described herein, it should be appreciated that any arrangement calculated to achieve the same purpose may be substituted for the specific embodiments shown. This disclosure is intended to cover any and all adaptations or variations of various embodiments. It is to be understood that the above description has been made in an illustrative fashion, and not a restrictive one. Combinations of the above embodiments, and other embodiments not specifically described herein will be apparent to those of skill in the art upon reviewing the above description. Thus, the scope of various embodiments includes any other applications in which the above compositions, structures, and methods are used.

In addition, in the present disclosure, various elements are grouped together in a single embodiment for the purpose of streamlining the disclosure. Yet, such illustrations are not to be interpreted as reflecting an intention that the claimed embodiments require more elements than are expressly recited in each claim. Rather, as the following claims reflect, inventive subject matter lies in less than all features of a single disclosed embodiment. In the appended claims, the terms "including" and "in which" are used as the plain-English equivalents of the respective terms "comprising" and "wherein," respectively. Moreover, the terms "first," "second," and "third," etc. are used merely as labels, and are not intended to impose numerical requirements on their objects.

Although the subject matter has been described in language specific to structural elements and/or methodological acts, it is to be understood that the subject matter defined in the appended claims is not necessarily limited to the specific elements or acts described above. Rather, the specific elements and acts described above are disclosed as example forms of implementing the claims.

Embodiments of the operational environments and techniques (procedures, methods, processes, and the like) are described herein with reference to block diagrams and flowchart illustrations of methods, systems, apparatuses and computer program products. It can be understood that each block of the block diagrams and flowchart illustrations, and combinations of blocks in the block diagrams and flowchart illustrations, respectively, can be implemented by computer-accessible instructions. In certain implementations, the computer-accessible instructions may be loaded or otherwise incorporated into a general purpose computer, special purpose computer, or other programmable information processing apparatus to produce a particular machine, such that the operations or functions specified in the flowchart block or blocks can be implemented in response to execution at the computer or processing apparatus.

Blocks of the block diagrams and flow diagrams support combinations of means for performing the specified functions, combinations of elements or steps for performing the specified functions and program instruction means for performing the specified functions. It will also be understood that each block of the block diagrams and flow diagrams, and combinations of blocks in the block diagrams and flow diagrams, may be implemented by special-purpose, hardware-based computer systems that perform the specified functions, elements or steps, or combinations of special-purpose hardware and computer instructions.

Unless otherwise expressly stated, it is in no way intended that any protocol, procedure, process, or method set forth herein be construed as requiring that its acts or steps be performed in a specific order. Accordingly, where a process or method claim does not actually recite an order to be followed by its acts or steps or it is not otherwise specifically recited in the claims or descriptions of the subject disclosure that the steps are to be limited to a specific order, it is in no way intended that an order be inferred, in any respect. This holds for any possible non-express basis for interpretation, including: matters of logic with respect to arrangement of steps or operational flow; plain meaning derived from grammatical organization or punctuation; the number or type of embodiments described in the specification or annexed drawings, or the like.

As used in this application, the terms "component," "environment," "system," "architecture," "interface," "unit," "module," "engine," "platform," "module," and the like are intended to refer to a computer-related entity or an entity related to an operational apparatus with one or more specific functionalities. Such entities may be either hardware, a combination of hardware and software, software, or software in execution. As an example, a component may be, but is not limited to being, a process running on a processor, a processor, an object, an executable portion of software, a thread of execution, a program, and/or a computing device. For example, both a software application executing on a computing device and the computing device can be a component. One or more components may reside within a process and/or thread of execution. A component may be localized on one computing device or distributed between two or more computing devices. As described herein, a component can execute from various computer-readable non-transitory media having various data structures stored thereon. Components can communicate via local and/or remote processes in accordance, for example, with a signal (either analogic or digital) having one or more data packets (e.g., data from one component interacting with another component in a local system, distributed system, and/or across a network such as a wide area network with other systems via the signal). As another example, a component can be an apparatus with specific functionality provided by mechanical parts operated by electric or electronic circuitry that is controlled by a software application or firmware application executed by a processor, wherein the processor can be internal or external to the apparatus and can execute at least a part of the software or firmware application. As yet another example, a component can be an apparatus that provides specific functionality through electronic components without mechanical parts, the electronic components can include a processor therein to execute software or firmware that confers at least in part the functionality of the electronic components. An interface can include input/output (I/O) components as well as associated processor, application, and/or other programming components. The terms "component," "environment," "system," "architecture," "interface," "unit," "engine," "platform," "module" can be utilized interchangeably and can be referred to collectively as functional elements.

In the present specification and annexed drawings, reference to a "processor" is made. As utilized herein, a processor can refer to any computing processing unit or device comprising single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit (IC), an application-specific integrated circuit (ASIC), a digital signal processor (DSP), a field programmable gate array (FPGA), a programmable logic controller (PLC), a complex programmable logic device (CPLD), a reduced instruction set computing (RISC) microprocessor, a discrete gate or transistor logic, discrete hardware components, or any combination thereof designed to perform the functions described herein. A processor can be implemented as a combination of computing processing units. In certain embodiments, processors can utilize nanoscale architectures, such as molecular and quantum-dot based transistors, switches and gates, in order to optimize space usage or enhance performance of user equipment.

In addition, in the present specification and annexed drawings, terms such as "store," storage," "data store," "data storage," "memory," "repository," and substantially any other information storage component relevant to operation and functionality of a component of the disclosure, refer to "memory components," entities embodied in a "memory," or components forming the memory. It can be appreciated that the memory components or memories described herein embody or comprise non-transitory computer storage media that can be readable or otherwise accessible by a computing device. Such media can be implemented in any methods or technology for storage of information such as computer-readable instructions, information structures, program modules, or other information objects. The memory components or memories can be either volatile memory or non-volatile memory, or can include both volatile and non-volatile memory. In addition, the memory components or memories can be removable or non-removable, and/or internal or external to a computing device or component. Example of various types of non-transitory storage media can comprise hard-disc drives, zip drives, CD-ROM, digital versatile disks (DVD) or other optical storage, magnetic cassettes, magnetic tape, magnetic disk storage or other magnetic storage devices, flash memory cards or other types of memory cards, cartridges, or any other non-transitory medium suitable to retain the desired information and which can be accessed by a computing device.

As an illustration, a non-volatile memory device can include ROM device, programmable ROM (PROM) device, electrically programmable ROM (EPROM) device, electrically erasable ROM (EEPROM) device, non-volatile RAM, and/or silicon-oxide-nitride-oxide-silicon (SONOS) device. As an illustration, NVRAM devices can be embodied in several forms, including flash memory devices and/or a resistive memory devices, such as magnetoresistive RAM (MRAM) devices, phase change RAM (PRAM) devices, and/or conductive bridge RAM (CBRAM)) devices. A volatile memory device can include RAM, which can act as an external cache memory device. By way of illustration and not limitation, RAM can be available in many forms, such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). The disclosed memory components or memories of operational environments described herein are intended to comprise one or more of these and/or any other suitable types of memory.

Conditional language, such as, among others, "can," "could," "might," or "may," unless specifically stated otherwise, or otherwise understood within the context as used, is generally intended to convey that certain implementations could include, while other implementations do not include, certain features, elements, and/or operations. Thus, such conditional language generally is not intended to imply that features, elements, and/or operations are in any way required for one or more implementations or that one or more implementations necessarily include logic for deciding, with or without user input or prompting, whether these features, elements, and/or operations are included or are to be performed in any particular implementation.

What has been described herein in the present specification and annexed drawings includes examples of systems, devices, techniques, and computer program products that can permit or otherwise facilitate configuration (e.g., can provide mechanisms to configure or otherwise establish) of data path groups in a low-power network (wireless or otherwise). It is, of course, not possible to describe every conceivable combination of elements and/or methods for purposes of describing the various elements of the disclosure, but it can be recognized that many further combinations and permutations of the disclosed features are possible. Accordingly, it may be apparent that various modifications can be made to the disclosure without departing from the scope or spirit thereof. In addition or in the alternative, other embodiments of the disclosure may be apparent from consideration of the specification and annexed drawings, and practice of the disclosure as presented herein. It is intended that the examples put forward in the specification and annexed drawings be considered, in all respects, as illustrative and not restrictive. Although specific terms are employed herein, they are used in a generic and descriptive sense only and not for purposes of limitation.

What is claimed is:

1. A device, comprising:
    at least one memory device having instructions encoded thereon; and
    at least one processor functionally coupled to the at least one memory device and configured to execute the instructions to:
        identify proximity information representative of an amount of physical separation of the device from a second device, wherein the proximity information is based on a received signal strength indicator (RSSI);
        configure a data link with the second device; and
        assign, based at least on a portion of the proximity information, the data link to an extant data path group associated with a cluster of devices including the device.

2. The device of claim 1, further comprising a radio unit that receives wireless signal from the second device according to a defined radio technology protocol, the radio unit comprising at least one transceiver and at least one antenna; and
    wherein to identify the proximity information, the at least one processor is coupled to the radio unit and further configured to execute the instructions to determine at least one of a channel path loss of the wireless signal, a ranging distance from the second device, or a location of the second device.

3. The device of claim 2, wherein the device comprises a communication unit that processes at least a portion of the wireless signal, according to the defined radio technology protocol, for a determination of one or more of the RSSI, the channel path loss, the ranging distance from the second device, or the location.

4. The device of claim 1, wherein the data link comprises a Neighbor Awareness Networking (NAN) data link, and wherein the data path group comprises a NAN data cluster.

5. The device of claim 1, wherein the at least one processor is further configured to execute the instructions to retain at least a portion of the proximity information in a data structure within the first device.

6. The device of claim 5, wherein the data structure comprises a field indicative of the at least the portion of the proximity information, and wherein the at least one processor is further configured to execute the instructions to associate the data structure to the data link.

7. The device of claim 5, wherein the at least one processor is further configured to execute the instructions to access second proximity information representative of a second amount of separation of the device from a third device;
    to configure a second data link; and
    to assign, based at least on a second portion of the second proximity information and the proximity information, the second data link to the extant data path group.

8. The device of claim 7, wherein the at least one processor is further configured to execute the instructions to determine a value of a defined function of the first proximity information and the second proximity information;
    to update the data structure to include the value; and
    to associate the value to the extant data path group.

9. The device of claim 1, wherein the at least one processor is further configured to execute the instructions to access link information indicative of data links respectively associated with data path groups, each of the data path groups associated with a respective cluster of devices;
    to access proximity information associated with the data path groups;
    to determine that a first data path group of the data path groups is associated with first proximity information that satisfies a proximity criterion; and to assign at least a subset of the data links to the first data path group.

10. The device of claim 9, wherein the at least one processor is further configured to execute the instructions to determine that a first data link of the data links has a first base schedule that includes a base schedule of a second data path group of the data path groups;
to determine that a second data link of the data links has a second base schedule that includes the base schedule; and
to assign the first data link and the second data link to the second data path group.

11. At least one computer-readable storage device having encoded thereon instructions that, in response to execution, cause a first device to perform or facilitate operations comprising:
accessing proximity information representative of an amount of separation of the first device from a second device, wherein the proximity information is based on a received signal strength indicator (RSSI);
configuring a data link with the second device; and
assigning, based at least on a portion of the proximity information, the data link to an extant data path group associated with a cluster of devices including the first device.

12. The at least one computer-readable storage device of claim 11, wherein the accessing the proximity information comprises determining at least one of a channel path loss of the wireless signal, a ranging distance from the second device, or a location of the second device.

13. The at least one computer-readable storage device of claim 11, the operations further retaining at least a portion of the proximity information in a data structure within the device.

14. The at least one computer-readable storage device of claim 13, wherein the data structure comprises an attribute having a field indicative of the at least the portion of the proximity information, the operations further comprising associating the attribute to at least one of the data link or the data path group.

15. The at least one computer-readable storage device of claim 13, the operations further comprising accessing second proximity information representative of a second amount of physical separation of the first device from a third device;
configuring a second data link; and
assigning, based at least on a second portion of the second proximity information and the proximity information, the second data link to the extant data path group.

16. The at least one computer-readable storage device of claim 15, the operations further comprising determining a value of a defined function of the first proximity information and the second proximity information;
updating the data structure to include the value; and
associating the value to the extant data path group.

17. The at least one computer-readable storage device of claim 11, wherein the assigning comprises determining that the extant data path group has a base schedule that is a subset of a second schedule of the data link.

18. The at least one computer-readable storage device of claim 11, wherein the assigning comprises determining that the second device in included in the cluster of devices associated with the extant data path group.

19. The at least one computer-readable storage device of claim 11, the operations further comprising receiving information indicative of the data path group prior to the assigning.

20. The at least one computer-readable storage device of claim 11, wherein the assigning comprises determining that a portion of the proximity information satisfies a proximity criterion;
identifying the data path group by determining that the data path group is associated with the portion of the proximity information.

21. The at least one computer-readable storage device of claim 11, the operations further comprising accessing link information indicative of data links respectively associated with data path groups, each of the data groups associated with a respective cluster of devices;
accessing proximity information associated with the data path groups;
determine that a first data path group of the data path groups is associated with first proximity information that satisfies a proximity criterion; and
assigning at least a subset of the data links to the first data path group.

22. The at least one computer-readable storage device of claim 21, further comprising determining that a first data link of the data links has a first base schedule that includes a base schedule of a second data path group of the data path groups;
determining that a second data link of the data links has a second base schedule that includes the base schedule; and
assigning the first data link and the second data link to the second data path group.

23. A device, comprising:
an access unit that identifies proximity information representative of an amount of physical separation of the device from a second device;
a configuration unit that configures a data link with the second device; and
an assignment unit that associates the data link to a data path group associated with a cluster of devices including the device, wherein the data link is associated based on a portion of the proximity information and at least one of second proximity information associated with extant data links or third proximity information associated with data path groups, wherein the proximity information is based on a received signal strength indication (RSSI), the second proximity information is based on a second RSSI, and the third proximity information is based on a third RSSI.

24. The device of claim 23, further comprising a radio unit that receives wireless signal from the second device according to a defined radio technology protocol, the radio unit comprising at least one transceiver and at least one antenna; and
a communication unit coupled to the radio unit, the communication unit generates information representative of the wireless signal.

25. The device of claim 24, wherein to identify the proximity information, the access unit receives at least a portion of the information, and determines, using at least the portion of the information, at least one of a channel path loss of the wireless signal, a ranging distance from the second device, or a location of the second device.

* * * * *